(12) United States Patent
Tashiro et al.

(10) Patent No.: US 9,617,462 B2
(45) Date of Patent: Apr. 11, 2017

(54) DEGRADABLE COMPOSITE MATERIALS AND USES

(71) Applicant: SCHLUMBERGER TECHNOLOGY CORPORATION, Sugar Land, TX (US)

(72) Inventors: Hitoshi Tashiro, Clamart (FR); S. Sherry Zhu, Waban, MA (US); Huilin Tu, Sugar Land, TX (US); Sudeep Maheshwari, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/369,115

(22) PCT Filed: Dec. 21, 2012

(86) PCT No.: PCT/US2012/071166
§ 371 (c)(1),
(2) Date: Jun. 26, 2014

(87) PCT Pub. No.: WO2013/101712
PCT Pub. Date: Jul. 4, 2013

(65) Prior Publication Data
US 2014/0360728 A1 Dec. 11, 2014

Related U.S. Application Data

(60) Provisional application No. 61/631,184, filed on Dec. 28, 2011.

(51) Int. Cl.
*E21B 43/22* (2006.01)
*C09K 8/50* (2006.01)
(Continued)

(52) U.S. Cl.
CPC ............... *C09K 8/50* (2013.01); *C08K 3/16* (2013.01); *C08K 3/22* (2013.01); *C08K 3/26* (2013.01);
(Continued)

(58) Field of Classification Search
CPC ........ E21B 43/16; E21B 43/26; E21B 43/267; C09K 8/50; C09K 8/516; C09K 8/805
See application file for complete search history.

(56) References Cited

U.S. PATENT DOCUMENTS

| 5,766,748 A | 6/1998 | Ikado et al. |
| 5,916,678 A | 6/1999 | Jackson et al. |

(Continued)

FOREIGN PATENT DOCUMENTS

| JP | 2011219555 A | 11/2011 |
| KR | 1020110037983 A | 4/2011 |
| WO | 2012036862 A1 | 3/2012 |

OTHER PUBLICATIONS

Calzolari, et al., "Water Adsorption on Nonpolar ZnO($10\bar{1}0$) Surface: A Microscopic Understanding", Journal of Physical Chemistry C, vol. 113, No. 7, 2009, pp. 2896-2902.
(Continued)

*Primary Examiner* — Zakiya W Bates
(74) *Attorney, Agent, or Firm* — Andrea E. Tran; Tim Curington

(57) ABSTRACT

In general, the current application relates to degradable composite and blend materials that have accelerated degradation in water in low temperature conditions, and their various industrial, medical and consumer product uses. In some embodiments, the degradable composite composition comprises a degradable polymer mixed with discrete particles of a filler that acts to accelerate the degradation of the degradable polymer. Such materials degrade in 60 C water
(Continued)

in less than 30 days, <14 days, and even <7 days. Various materials are provided that can degrade equally fast at lower temperatures, such as 50 C, or even 40 C.

18 Claims, 23 Drawing Sheets

(51) Int. Cl.
    *E21B 43/16* (2006.01)
    *C09K 8/516* (2006.01)
    *C08K 3/16* (2006.01)
    *C08K 3/22* (2006.01)
    *C08K 3/26* (2006.01)
    *C08K 5/098* (2006.01)
    *C08K 5/42* (2006.01)
    *C09K 8/80* (2006.01)

(52) U.S. Cl.
    CPC ........... *C08K 5/098* (2013.01); *C08K 5/42* (2013.01); *C09K 8/516* (2013.01); *C09K 8/805* (2013.01); *E21B 43/16* (2013.01); *C08K 2003/222* (2013.01); *C08K 2003/2296* (2013.01); *C08K 2003/262* (2013.01)

(56) References Cited

U.S. PATENT DOCUMENTS

| | | |
|---|---|---|
| 7,275,596 B2 | 10/2007 | Willberg et al. |
| 7,380,600 B2 | 6/2008 | Willberg et al. |
| 7,380,601 B2 | 6/2008 | Willberg et al. |
| 7,565,929 B2 | 7/2009 | Bustos et al. |
| 7,703,521 B2 | 4/2010 | Sullivan et al. |
| 7,748,452 B2 | 7/2010 | Sullivan et al. |
| 7,775,278 B2 | 8/2010 | Willberg et al. |
| 7,786,051 B2 | 8/2010 | Lange et al. |
| 7,833,950 B2 | 11/2010 | Willberg et al. |
| 7,858,561 B2 | 12/2010 | Abad et al. |
| 2006/0083917 A1 | 4/2006 | Dugan |
| 2008/0196896 A1* | 8/2008 | Bustos .............. E21B 43/267 166/281 |
| 2010/0273685 A1 | 10/2010 | Saini et al. |

OTHER PUBLICATIONS

Chisholm, et al., "Hydrolytic stability of sulfonated poly(butylene terephthalate)", Polymer, vol. 44, No. 6, Mar. 2003, pp. 1903-1910.
Li, et al., "Preparation and Characterization of Polymer-Inorganic Nanocomposites by In Situ Melt Polycondensation of I-Lactic Acid and Surface-Hydroxylated MgO", Biomacromolecules, vol. 11, No. 7, 2010, pp. 1847-1855.
Meyer, et al., "Partial Dissociation of Water Leads to Stable Superstructures on the Surface of Zinc Oxide", Angewandte Chemie International Edition, vol. 43, No. 48, Dec. 10, 2004, pp. 6641-6645.
Mural!, et al., "Effects of silane coatings in aqueous and non-aqueous media on the properties of magnesia filled PTFE laminates", Materials Chemistry and Physics, vol. 122, No. 2-3, 2010, pp. 317-320.
Murariu, et al., "Pathways to PLA-ZnO nanocomposites designed for production of films and fibers with special end-use properties", 2010, 1 page.
Noei, et al., "The identification of hydroxyl groups on ZnO nanoparticles by infrared spectroscopy", Physical Chemistry Chemical Physics, vol. 10, No. 47, 2008, pp. 7092-7097.
Proikakis, et al., "Swelling and hydrolytic degradation of poly(D,L-lactic acid) in aqueous solutions", Polymer Degradation and Stability, vol. 91, Issue 3, Mar. 2006, pp. 614-619.
Valtiner, et al., "Stabilization and Acidic Dissolution Mechanism of Single-Crystalline ZnO(0001) Surfaces in Electrolytes Studied by In-Situ AFM Imaging and Ex-Situ LEED", Langmuir, vol. 24, No. 10, 2008, pp. 5350-5358.
Zhang, et al., "Morphological behaviour of poly(lactic acid) during hydrolytic degradation", Polymer Degradation and Stability, vol. 93, No. 10, Oct. 2008, pp. 1964-1970.
Zhou, et al., "Nanoclay and crystallinity effects on the hydrolytic degradation of polylactides", Polymer Degradation and Stability, vol. 93, No. 8, Aug. 2008, pp. 1450-1459.
International Search Report and Written Opinion issued in PCT/US2012/071166 on Apr. 29, 2013, 13 pages.
Office Action issued in Chinese Patent Application No. 201280070762.8 on Apr. 22, 2016; 10 pages (with English translation).

* cited by examiner

| TABLE 6. THE COMPOSITIONS OF PLA/PARAFFIN WAX | | | | | | | | |
|---|---|---|---|---|---|---|---|---|
| SAMPLE CODE | TOTAL WT (g) | 6060D RESIN (g) | 6201D RESIN (g) | PARAFFIN WAX (g) | PARAFFIN WAX % | $T_{g2}$(°C) | % CRYSTAL-LINE | HOT PRESSED FILM |
| 7132011-6201-WAX-1 | 6 | 0 | 5.97 | 0.03 | 0.50% | 53.68, 59.11 | 33.33% | |
| 7132011-6201-WAX-2 | 6 | 0 | 5.94 | 0.06 | 1.00% | 54.76 | 34.54% | |
| 6201D FILM | | | | | | 61.31 | 8.29% | |
| 7132011-6060-WAX-1 | 6 | 5.97 | 0 | 0.03 | 0.50% | 55.49 | | |
| 7132011-6060-WAX-1 | 6 | 5.94 | 0 | 0.06 | 1.00% | 54.81 | | |

*FIG. 5*

TABLE 7. FORMULATION OF PLA/EVOH BLENDS

| SAMPLE CODE | PLA% | EVOH% | EXTRUSION TEMPERATURE (°C) | HOT PRESSED FILM |
|---|---|---|---|---|
| 6222011-6201-A4412 | 90% | 10% | 170 | |
| 6222011-6060-A4412 | 90% | 10% | 170 | |
| 6060D FILM | | | | |
| 6222011-6201-D2908 | 90% | 10% | 180 | |
| 6222011-6060-D2908 | 90% | 10% | 180 | |

FIG. 8

| TABLE 8. COMPOSITION OF PLA/TH300 | | | |
|---|---|---|---|
| SAMPLE CODE | RESIN TYPE | TH300% | HOT PRESSED FILM |
| 7152011-6201-TH300-1 | 6201D | 2.00% | |
| 7152011-6201-TH300-2 | 6201D | 4.00% | |
| 7152011-6060-TH300-1 | 6060D | 2.00% | |
| 7152011-6060-TH300-2 | 6060D | 4.00% | |

FIG. 13

DEGRADABLE COMPOSITE MATERIALS AND USES

BACKGROUND

Degradable materials have many uses in our society, ranging from making degradable plastic bags, diapers, and water bottles, to making degradable excipients for pharmaceutical delivery and degradable implants for surgical use, to a wide variety of industrial uses, such as in soil remediation, agriculture, and oil and gas production.

For example, degradable materials have been used for fluid loss control, for diversion, and as temporary plugs in downhole applications of oil and gas production. Examples of degradable materials that have been used downhole include rock salt, benzoic acid flakes, wax beads, wax buttons, oil-soluble resin materials, and the like. In addition to filling and blocking fractures and permeable zones right in the reservoir, degradable materials have also been used to form consolidated plugs in wellbores that degrade after use, eliminating the need for retrieval.

New materials that can be used in such applications are always needed, and in particular materials that quickly degrade under downhole conditions are particularly needed.

SUMMARY

In general, the current application relates to degradable composite and blend materials that have accelerated degradation in water in low temperature conditions, and their various industrial, medical and consumer product uses.

In various embodiments, the degradable composite composition comprises a degradable polymer mixed with discrete particles of a filler that acts to accelerate the degradation of the degradable polymer. Such materials degrade in 60° C. water in less than 30 days, <14 days, and even <7 days. Various materials are provided that can degrade equally fast at lower temperatures, such as 50° C., or even 40° C.

The discrete particles are 10 nm to 5 microns in mean average size, smaller particles tending to further accelerate degradation. The filler particles can be water soluble materials, include hygroscopic or hydrophilic materials, a meltable material, such as wax, or a reactive filler that can catalyze degradation, such as a material that provides an acid, base or metal ion.

In some cases, the discrete particles have a protective coating, thus allowing them to be mixed with the degradable polymer and/or heated during manufacturing processes, such as extrusion, whilst retaining their integrity. The coatings can also be chosen to delay degradation or fine tune the rate of degradation for particular conditions.

Examples of degradable polymers include aliphatic polyesters, poly(lactic acid) (PLA), poly(ϵ-caprolactone), poly(glycolic acid), poly(lactic-co-glycolic acid), poly(hydroxyl ester ether), polyhydroxyalkanoate (PHA), poly(hydroxybutyrate), poly(anhydride), polycarbonate, poly(amino acid), poly(ethylene oxide), poly(phosphazene), polyether ester, polyester amide, polyamides, sulfonated polyesters, poly(ethylene adipate), polyhydroxyalkanoate, poly(ethylene terephtalate), poly(butylene terephthalate), poly(trimethylene terephthalate), Poly(ethylene naphthalate) and copolymers, blends, derivatives or combination of any of these degradable polymers. PLA is a particularly useful polymer, as it is non-toxic and its breakdown products are likewise non-toxic. Further, it is readily available in a variety of molecular weights and degrees of crystallinity, and is easily made.

Examples of water soluble fillers comprise NaCl, $ZnCl_2$, $CaCl_2$, $MgCl_2$, $NaCO_3$, $KCO_3$, $KH_2PO_4$, $K_2HPO_4$, $K_3PO_4$, sulfonate salts, such as sodium benzenesulfonate (NaBS), sodium dodecylbenzenesulfonate (NaDBS), water soluble/hydrophilic polymers, such as poly(ethylene-co-vinyl alcohol) (EVOH), modified EVOH, SAP (super absorbent polymer), polyacrylamide or polyacrylic acid and poly(vinyl alcohols) (PVOH), and the mixture of these fillers.

Examples of fillers that melt under conditions of use include waxes, such as candelilla wax, carnauba wax, ceresin wax, Japan wax, microcrystalline wax, montan wax, ouricury wax, ozocerite, paraffin wax, rice bran wax, sugarcane wax, Paricin 220, Petrac wax 165, Petrac 215, Petrac GMS Glycerol Monostearate, Silicon wax, Fischer-Tropsch wax, Ross wax 140 or Ross wax 160.

Examples of reactive fillers that accelerate degradation include metal oxides, metal hydroxides, and metal carbonates, such as $Ca(OH)_2$, $Mg(OH)_2$, $CaCO_3$, Borax, MgO, CaO, ZnO, NiO, CuO, $Al_2O_3$, a base or a base precursor.

The degradable composites can also include a metal salt of a long chain (defined herein as ≥C8) fatty acids, such as Zn, Sn, Ca, Li, Sr, Co, Ni, K octoate, stearate, palmate, myrisate, and the like.

In other embodiments, the degradable composite composition comprises a degradable PLA mixed with discrete particles of either i) a water soluble material, ii) a wax filler, iii) a reactive filler, or iv) combinations thereof, said degradable composite degrading in 60° C. water in less than 30, 14 or 7 days.

Other embodiments include compositions comprising a matrix comprising a plurality of voids, said matrix comprising PLA or any other degradable polymer, a filler that fills in at least a portion of the plurality of the voids of said matrix, said filler being any of the fillers herein described or otherwise acting to accelerate degradation, such that the composition degrades in water at a temperature of 60° C. or less in 4, 2, or 1 week or less.

Other embodiments provide the degradable composite compositions of Tables 3-12.

Method of using a degradable composite are described, for example injecting a fluid comprising water and any of the compositions herein described into a subterranean reservoir, degrading said composition, and producing a hydrocarbon from said subterranean reservoir. Other methods of use include the making of degradable consumer products such as plastic bags, diapers, water bottles, use in health care, such as in making drug delivery vehicles or degradable implants or bandages and sutures, and agricultural, remediation, waste management or other industrial uses.

By "degradable polymer" what is meant is a polymer that can be degraded in water at 60° C. in 30 days or less, preferably in 14 or 7 days or less.

By "degraded" what is meant is at least a 50% reduction in dry weight, or if assessed by flowthrough, at least a 50% increase in flow.

By "water soluble" what is meant is a material that dissolves in water in 7 days or less, preferably in 2 days or 1 day or less. Water soluble materials include hygroscopic materials and hydrophilic materials.

By "reactive filler" what is meant is a material that accelerates the degradation of the degradable polymer as compared with the same polymer without said reactive filler.

By "meltable material" what is meant is any material that melts under the intended conditions of use. For example, waxes will melt when the compositions are deployed in a reservoir.

The following abbreviations are used herein:

| ABBREVIATION | TERM |
| --- | --- |
| DI | Deionized water |
| PVOH | Poly(vinyl alcohol) |
| PLA | Poly(lactic acid) |
| SEM | Scanning electron microscope |
| ULT | Ultra low temperatures |
| EVOH | Poly(ethylene-co-vinyl alcohol) |
| DSC | Differential scanning calorimetry |
| TEM | Transmission electron microscopy |
| TGA | Thermogravimetric snalysis |
| FTIR | Fourier transform infrared spectroscopy |

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DESCRIPTION OF FIGURES

FIG. 5: Water uptake % of PLA 6060D and 6060D/1% wax blends after 1 day and 3 days at room temperature and 60° C.

FIG. 8: DSC (2# scan, 10° C./min) of 6201D/10% A4412 blends.

FIG. 13: The degradation profiles at 49° C. in water. (A) 6060D/MgO 170 composites; (B) 6060D/MgO 170s composites.

DETAILED DESCRIPTION

Figure 1:
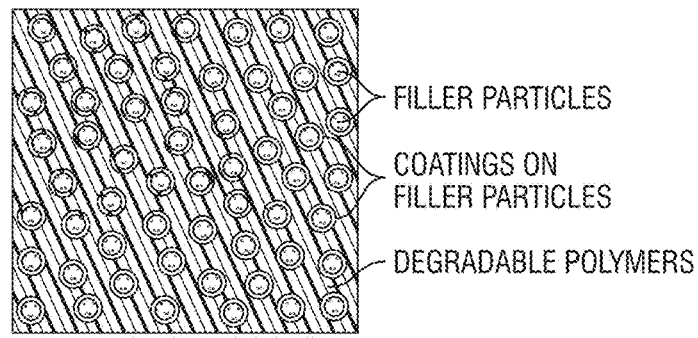
FIG. 1: Illustration of a composite with coatings on the surface of the filler particles.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited.

Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific numbers, it is to be understood that any and all data points within the range are to be considered to have been specified.

In general, the application related to composite materials that achieve accelerated degradation at Ultra Low Temperature (≤60° C.), and their uses in subterranean formations, although the materials described herein have many uses.

Disclosed embodiments relate to compositions of polymer(s) and filler composite(s) that degrade rapidly in water at low temperatures, such as below 60° C., <50° C., or <40° C. In some embodiments, the materials are comprised of degradable polymers as the polymer matrix and particulates as the fillers in the polymer matrix. In some cases, the low temperature degradable materials can achieve approximately 100% degradation at low temperature environment within a week. Metal salts or esters of long chain fatty acids may be used to further accelerate the degradation.

The low temperature degradable materials may take the forms of fibers, rods, flakes, films, and particles, etc., and are applicable to oilfield services applications to stabilize proppant pack, improve facture geometry, produce fluid diversion, improve sand management, mitigate lost circulation, etc. in drilling, cementing and completions, etc. However, such degradable materials can find uses in many industries, including e.g., consumer products, waste management products, healthcare, agriculture, remediation and the like.

In some embodiments, compositions of the degradable, particulate-filled composites of the current application ("degradable composites") is able to achieve an accelerated degradation, measured as weight loss % of the original weight, compared with the correspondent matrix polymers at ≤60° C. in water in less than 30 days, preferably in less than 2 weeks or even one week. In some cases, the composites achieved 100% degradation (weight loss %) within 7 days at T≤50° C., or T≤40° C. in water.

The "degradable polymers" herein refers to polymers that are capable of being degraded (break down to oligomers or monomers) in an aqueous environment. Polymer degradation in water is measurable by the weight loss of the solid polymers over a period of time. A decrease of molecular weight of the polymer (measured by Gel Permeation Chromatography, intrinsic viscosity or other well known methods to characterize molecular weight of the polymers) can also be used to measure degradation.

Examples of the suitable degradable polymers for developing degradable composites include, but are not limited to, aliphatic polyesters, poly(lactic acid), poly(ε-caprolactone), poly(glycolic acid) (PGA), poly(lactic-co-glycolic acid) (PLGA), poly(hydroxyl ester ether), polyhydroxyalkanoate (PHA), poly(hydroxybutyrate), poly(anhydride), polycarbonate, poly(amino acid), poly(ethylene oxide), poly(phosphazene), polyether ester, polyester amide, polyamides, sulfonated polyesters, poly(ethylene adipate) (PEA), polyhydroxyalkanoate (PHA), poly(ethylene terephtalate) (PET), poly(butylene terephthalate) (PBT), poly(trimethylene terephthalate) (PTT), poly(ethylene naphthalate) (PEN) and copolymers, blends, derivatives or combination of any of these degradable polymers.

A particular useful polymer is poly(lactic acid) (PLA) because it is readily available and non-toxic. Poly(lactic acid) can be produced either by direct condensation of lactic acid or by catalytic ring-opening polymerization of cyclic lactides, and PLAs are also readily commercially available. Lactic acid, usually produced commercially through bacterial fermentation, is a chiral molecule and has two optical active isomers: the D isomer and the L isomer. The D isomer content in the PLA determines the crystallinity of the PLA polymer. Fully amorphous PLA includes relatively high D content (>20%) where highly crystalline PLA contains less than 2% D isomer. Examples of the amorphous PLA resins include 6060D, 6302D, or 4060D resins from NatureWorks, and examples of crystalline PLA resins include 6201D or 6202D resins from NatureWorks. The matrix polymer in the degradable composites may comprise only the amorphous, only the crystalline PLA, or a blend of amorphous and crystalline PLA. A PLA polymer blend can be a simple mechanical mixture of amorphous and crystalline PLA polymers.

At least three types of fillers can be chosen to form the PLA/filler composite, each filler serving to hasten degradation. The first type of fillers can be hygroscopic, hydrophilic, or water soluble solids. These fillers not only generate the interfacial surface area between fillers for faster water penetration but also drive water into the degradable polymer/filler composites due to osmotic pressure.

Fast water penetration into the degradable composites is particularly important at lower temperatures where the rate of water penetration is slow. Examples of the hygroscopic or water soluble solids include, but are not limited to, sugar, salt (NaCl), $ZnCl_2$, $CaCl_2$, $MgCl_2$, $NaCO_3$, $KCO_3$, potassium phosphate ($KH_2PO_4$, $K_2HPO_4$, $K_3PO_4$), and sulfonate salts such as sodium benzenesulfonate (NaBS), sodium dodecylbenzenesulfonate (NaDBS), water soluble/hydrophilic polymers such as poly(ethylene-co-vinyl alcohol), (EVOH), modified EVOH, SAP (super absorbent polymer), polyacrylamide or polyacrylic acid, and poly(vinyl alcohols) (PVOH), and the mixture of these fillers. In some embodiments, NaCl, $NaCO_3$, NaBS, NaDBS, EVOH, or their combinations, are used as the fillers.

The second type of filler is a phase-changing filler (e.g., meltable fillers) with defined melting points. Phase-changing fillers, such as (but not limited to) waxes that increase free volume in the polymers after the wax melts, increasing the porosity and thus water penetration into the polymers. Most waxes are hydrophobic crystalline solids. A blend of PLA and wax could make PLA more hydrophobic at temperatures below the melting point of the wax (which will benefit the shelf life of PLA/wax composites). At a temperature above the melting point of the wax, the wax melts into a liquid form, and the volume of the wax decreases upon the phase transition that results in an increased free volume inside the polymers for fast water penetration.

The choice of the wax largely depends on the melting point of the wax and the degradation temperature in the wells. For example, paraffin wax is chosen to blend with PLA for applications at temperature >55° C. Table 1 lists some waxes that can be blended with PLA or other degradable polymers or polyesters.

TABLE 1

Phase-changing waxes and their melting points.

| Material or substance name | Specific gravity | Melting point (° C.) |
|---|---|---|
| candelilla wax | 0.983 | 67-68 |
| carnauba wax | 0.995 (15/15° C.) | 84-86 |
| ceresin wax | 0.92-0.94 | 68-72 |
| Japan wax | 0.970-0.980 | 53 |
| microcrystalline wax | | 145-190° F. |
| montan wax | | 80-90 |
| ouricury wax | 0.970 (15° C.) | 83 |
| ozocerite | 0.85-0.95 | 55-110 (usually 70) |
| paraffin wax | 0.880-0.915 | 47-65 |
| rice bran wax | | 75 |

TABLE 1-continued

Phase-changing waxes and their melting points.

| Material or substance name | Specific gravity | Melting point (° C.) |
|---|---|---|
| sugarcane wax | | 76-79 |
| Paricin 220 | 1.049 | 104 |
| Petrac wax 165 | | 165° F. |
| Petrac 215 | | 212° F. |
| PEtrac GMS Glycerol Monostearate | | 140° F. |
| Silicon wax | | 25-44 |
| Fischer-Tropsch wax | | |
| Ross wax 140 | | 138-145 |
| Ross wax 160 | 1.02 | 157-166 |

The third kind of fillers is reactive fillers, including bases or base precursors that generate hydroxide ions or other strong nucleophiles when in contact with water. The reactive fillers can improve both the rate of water penetration into the composites and the rate of ester hydrolysis through the catalytic effect of nucleophiles.

Examples of the reactive fillers include, but are not limited to, $Ca(OH)_2$, $Mg(OH)_2$, $CaCO_3$, Borax, MgO, CaO, ZnO, NiO, CuO, $Al_2O_3$, and other bases or compounds that can convert to bases when in contact with water.

The particle sizes of the fillers can be in the range of 10 nm to several hundred nanometers, or even 1-5 microns in size, e.g., 50-300 nm. Smaller fillers with larger total surface area can result in faster degradation at the given temperatures compared to bigger fillers with smaller total surface area. The loading of the fillers as a weight percentage of the total composite can be in the range of 0.5% to 70%, depending on the choice of fillers and their molecular weight, and the desired characteristics of the final material.

Each filler can be used alone or in combination with other fillers and additives. In some embodiments, the degradable material of the current application comprises the combination of ZnO with a small amount of other fillers such as MgO, salts, waxes, hydrophilic polymers such as EVOH or PVOH, or their mixtures.

In some embodiments, the degradation of the particulate-filled PLA composites (particles or fibers) can be further accelerated when adding a small amount (<1.5%) of metal salts of long chain fatty acid (≥C8) or esters of long chain fatty acids. These amphiphilic additives have a hydrophilic 'head' and a hydrophobic long chain 'tail,' and tend to adhere to particle surfaces. The role of these amphiphilic additives is to improve the particle dispersion in the polymer matrix and promote water penetration into the composite. The loading of the metal salts or esters of long chain fatty acids can be in the range of 1-5% or 0.2-2% weight percent of total composite.

In some embodiments, plasticizers may also be included in the degradable PLA/filler composites for smooth processing, and may even enhance the degradation of the composites. The plasticizers may be mechanically mixed with the degradable polymers and the fillers during the compounding or extrusion processes. The plasticizers commonly used for plastics processing may be used here. The choices of the plasticizers for developing the composites depend on the choices of the degradable polymers, processing methods, processing temperatures, and the desired properties of the degradable composites.

Other small amounts of additives or polymers such as compatibilizers, fire retardants, anti-microbials, pigments, colorants, lubricants, UV stabilizers, thermal stabilizers, dispersants, nucleation agents, etc. that are commonly used in the plastic processing industry may also be included. These additives include, but are not limited to, organic carboxylic acid, carboxylic acid ester, metal salts of organic carboxylic acid, multicarboxylic acid, fatty acid esters, fatty acid ethers, fatty acid amides, sulfonamides, polysiloxanes, organophosphorous compound, $Al(OH)_3$, quaternary ammonium compounds, silver base inorganic agents, carbon black, metal oxide pigments, dyes, silanes, and titanate etc.

In some embodiments, coatings or protective layers on the reactive filler surfaces may be used to control or tune the degradation profiles, or protect the fillers during processing. The protective layers of polymers, monolayers, and coatings on the fillers can be thin layers of hydrophobic monomer or polymers that protect the active surface of the reactive fillers. This layer of protection may reduce the thermal degradation during common processing steps such as compounding, extrusion and melt spinning. The materials to form the protective layers can be selected from the silane families, long chain alcohols, block copolymers of poly(ethylene glycol)-poly(propylene oxide)-poly(ethylene glycol) (PEG-PPO-PEG, known as Pluronics) or maleate modified EVA resins, but are not limited to these examples.

In some embodiments, these molecules have functional groups that can interact with the filler surface, as well as a hydrophobic component to blend well with the polymer matrix. The protective coating can be applied to the filler surfaces through precoating or in situ adhesion. Selected silanes and long chain alcohols can be precoated to the filler surfaces. Pluronic or maleate modified EVA resins, silanes and long chain alcohols may be co-compounded with fillers and PLA resins, and achieve in situ adhesion between the functional group of the polymer and the fillers. The coating is between 1-4% of the total fillers by weight. When the degradable composite are immersed in water, the water will take time to swell and penetrate the coating and then interact with the fillers to generate nucleophiles that react with the polymer matrix. In some cases, the degradation can be delayed for a few hours to a few days and then complete within the time frame defined by the loading of the fillers. The exact delay of degradation time may be controlled through the choice of materials for coatings, as well as through the thickness of the coatings. FIG. 1 further illustrates this aspect.

PLA composites can be made using compounding, extrusion, solution polymerization of lactic acid with fillers. The bulk PLA composites can be made using injection molding, compression molding, melt spinning (for fibers) or briquetting processes of filled PLA. In one embodiment, a ThermoHaake MiniLab micro-compounder can be used as a lab scale compounder that can melt and extrude around 5 g/batch of polymer composite rods that are later cut into 6 mm long particles for further degradation evaluation. Melt spinning processes are used to develop composite PLA fibers with fillers. The detailed process conditions of extrusion and fiber melt spinning are outlined below.

Extrusion of Degradable Composites

PLA polymer resins in the form of pellets can be grounded into powders under cryogenic conditions, and dried at 49° C. for amorphous PLA or at 80° C. for crystalline PLA in an oven overnight. A specific amount of polymer powders can be premixed with the fillers in glass vials, and the vials can be inverted about 10 times to make sure the heterogeneous solid powders were well mixed. The mixture of the PLA powders and fillers can be extruded using a Thermo Haake MiniLab micro-compounder. The extrusion/compounding temperature can be set in the range of 150-170° C. depending on the choice of the PLA resins.

Examples of extrusion conditions are listed in Table 2. The maximum torque of each extrusion batch can be maintained below 360 Ncm, and the materials can be cycled inside the chamber for about 3-4 minutes before flushing. The flushing can be stopped when the torque drops to around 40 Ncm. The diameter of the extruded composite can be around 1 mm.

TABLE 2

The ThermoHaake MiniLab extrusion conditions

| Matrix Resins | Extrusion Temperature (° C.) | Speed of screws (min$^{-1}$) | Extrusion Time (min) |
|---|---|---|---|
| PLA 6060D | 160 | 100 | 6 |
| PLA 6201D | 170 | 100 | 6 |
| Blend of 6060D/6201D | 170 | 100 | 6 |

Melt Spinning Conditions Degradable Composites

The melt spinning of PLA filaments can be conducted e.g., on a Hills Research Line. The Hills Research Line is a homo-component fiber spinning line equipped with a single screw extruder. The spinning process conditions can be defined based on the choices of the polymers, the fillers, and the desired fiber dimension and morphology. Examples of spinning conditions are outlined as the following:

The feed roll and the draw roll speeds, which control the spinning speed, can be controlled in the range of 500-3000 m/m.

The throughput can be in the range of 0.15 to 0.9 (ghm: gram/hole/minute).

The draw ratio can be in the range of 1 to 4, depending on the ratio of draw roll speed and the feed roll speed.

The set of extruder and spinning temperatures can be in the range of 180–235° C.

When spinning PLA fibers with fillers (composite fibers), the additives can be added in as a master batch with 10% fillers in PLA.

Materials

The following materials were used herein:

NatureWorks 6201D, semicrystalline poly(lactic acid) resin; D % = 1.2%, m.p. 160-170° C.
NatureWorks 6060D, amorphous poly(lactic acid) resin; m.p. 120-130° C.
ZnO particles, 99.5%, Acros, average particle size is around 250 nm.
ZnO nanoparticles, MKN-ZnO-R040, 99.9%, MK Impex, average particle size is around 40 nm.
MgO particles, Elastomag, 170 and 170 special (170s), average particle size is around 250 nm.
ZnOct: Zinc 2-ethylhexanoate, or Zinc Octoate, 22% Zinc. Aldrich.
NaBS: Sodium benzenesulfonate. Aldrich.
NaDBS: Sodium dodecylbenzenesulfonate. Aldrich.
NaCl: Morton flour salt (<70 mesh), ball milled to an average diameter of 2.0 ± 1.6 μm.
Na$_2$CO$_3$: Sigma-Aldrich, anhydrous powder, as received. Aldrich.

1 g of Silquest® A-1524 was added to 40 ml of isopropanol (IPA), and 0.24 g of water was added to the solution. The solution was stirred at room temperature for 3 hours. 10 g of the anhydrous MgO 170s (Elastmag 170 special) were added to the silane/IPA solution, and the solution was stirred for one more hour. The silane coated MgO was filtered, rinsed with IPA, and dried at 100° C. in a vacuum oven overnight.

The composite of PLA and silane coated MgO was made following the same extrusion procedure described above.

The PLA composite fibers or rods (made through extrusion) were cut to 6 mm long. A fixed amount of the composite particles or fibers were immersed in 100 ml of DI water. The bottles were kept at the defined temperatures, and the degradation lasted for 2, 4, 7, 14 or 21 days. After degradation, the residuals were filtered and washed with DI water three times before being dried at 49° C. in an oven. The weight loss as a percentage of the total original weight was calculated and used as the degree of degradation.

TEM images of the PLA/filler composites were taken using a JEOL JEM-2010F Field Emission Transmission Electron Microscope.

PLA/Na$_2$CO$_3$ Composites

Table 3 presents the composition and T$_g$ of the 6060D PLA/Na$_2$CO$_3$ composites. For comparison, the pure 6060D PLA resin was extruded and used as a control (0 phr sample), where phr means parts per hundred resin.

Figure 2:
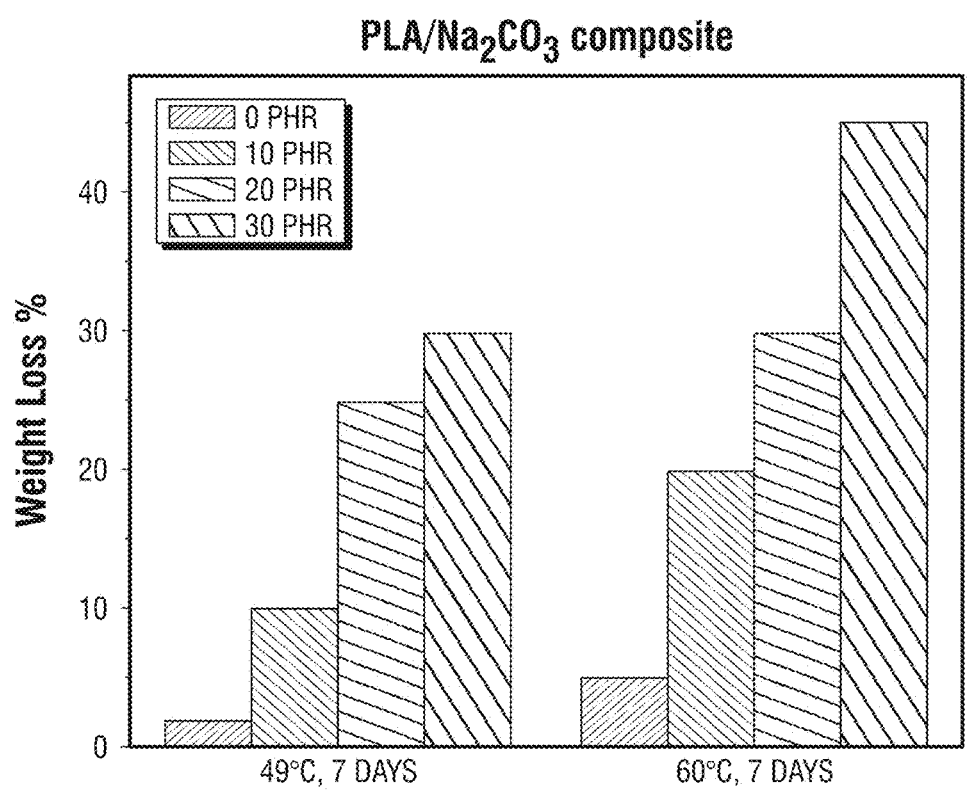
FIG. 2: Degradation results of PLA/Na$_2$CO$_3$ composite particles at 49° C. and 60° C. in water.

The glass transition temperatures, T$_g$, of PLA/Na$_2$CO$_3$ composites were consistently lower than the pure PLA by about 5° C., indicating that there is some degradation of PLA during extrusion. The PLA/Na$_2$CO$_3$ composite rods were cut into particles of 6 mm in length and 1 mm in diameter and exposed to 49 and 60° C. water for 7 days. FIG. 2 presents the degradation results.

TABLE 3

The composition and T$_g$ of PLA/Na$_2$CO$_3$ composites and the TGA-measured weight ratio of Na$_2$CO$_3$

| Na$_2$CO$_3$ in PLA | PLA 6060D (g) | Na$_2$CO$_3$ (g) | Weight Na$_2$CO$_3$% | Volume Na$_2$CO$_3$% | Tg (° C.) | Na$_2$CO$_3$%, virgin sample | Residual Weight Na$_2$CO$_3$%, after degradation at 49° C. for 7 days |
|---|---|---|---|---|---|---|---|
| 0 phr | 6.56 | 0 | 0 | 0 | 56.34 | 0 | 0 |
| 10 phr | 6.25 | 0.62 | 9.1 | 4.67 | 51.04 | 13.63 | 8.23 |
| 20 phr | 5.97 | 1.19 | 16.7 | 8.89 | 51.01 | 21.89 | 4.58 |
| 30 phr | 5.72 | 1.72 | 23.1 | 12.8 | 52.57 | 28.06 | 13.63 |

At 49° C., the pure PLA had minimum degradation (2%). In comparison, the PLA/Na$_2$CO$_3$ composite samples degraded more significantly. The weight loss was due to the combination of dissolution of Na$_2$CO$_3$ and PLA degradation. The combined value of dissolved Na$_2$CO$_3$% (differences in the TGA-measured Na$_2$CO$_3$% of the virgin and after-degradation samples in Table 3) and the weight loss % of pure PLA was less than the actual degradation result, especially for the 20 and 30 phr samples. This indicates that the addition of Na$_2$CO$_3$ enhances the degradation of PLA in the composites.

At 60° C., the composites showed significantly more weight loss % than that of the PLA control samples. The total weight loss % exceeded the combined loading of Na$_2$CO$_3$% in the original composites and the weight loss % of pure PLA, a clear indication of more polymer degradation in the composite than in the pure PLA polymers.

PLA/NaCl Composites

Figure 3:
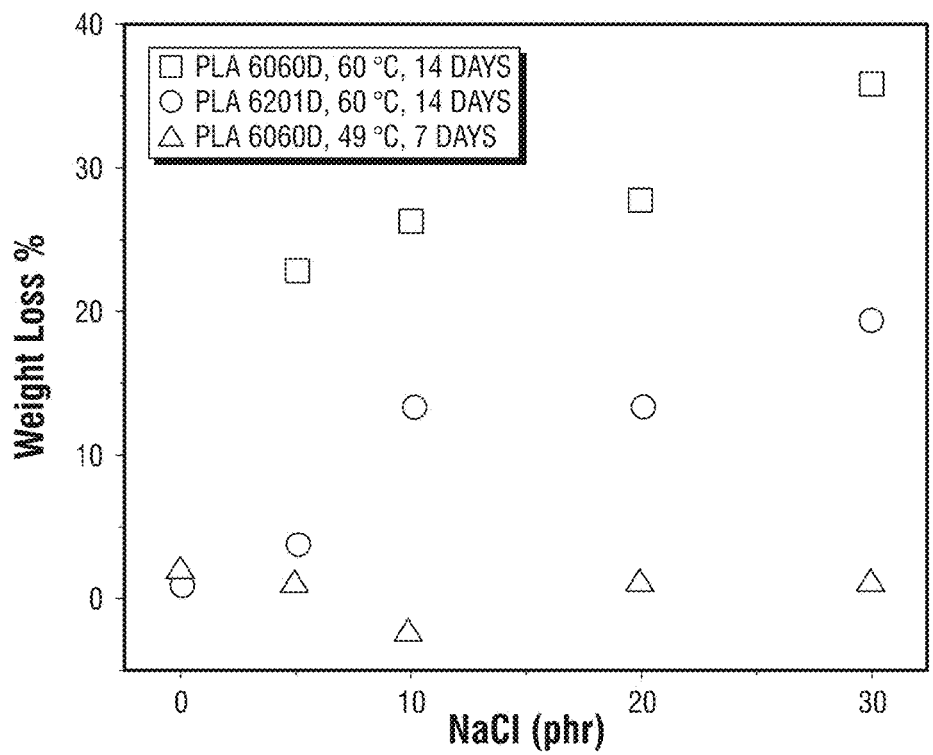
FIG. 3: Degradation results of PLA/NaCl composite particles at 49° C. and 60° C. in water. 14 and 7 day tests shown.

Table 4 presents the composition and $T_g$ of the 6060D PLA/NaCl composites. For comparison, the pure 6060D PLA resin was extruded and used as a control (0 phr sample). The $T_g$ values of PLA/NaCl composites were the same as or slightly higher than that of pure PLA, indicating that there was minimum degradation while extrusion. The PLA/NaCl composite rods were cut into particles of 6 mm in length and 1 mm in diameter and exposed to 49 and 60° C. water for 7 or 14 days. The degradation results are shown in FIG. 3.

TABLE 4

The composition of PLA/NaCl composites

| NaCl in PLA | PLA (g) | NaCl (g) | Weight NaCl % | Volume NaCl % | $T_g$ (° C.) |
|---|---|---|---|---|---|
| 0 phr | 6.20 | 0 | 0 | 0 | 56.34 |
| 5 phr | 6 | 0.3 | 4.8 | 2.8 | 56.39 |
| 10 phr | 5.86 | 0.59 | 9.1 | 5.4 | 57.08 |
| 20 phr | 5.56 | 1.11 | 16.7 | 10.3 | 57.98 |
| 30 phr | 5.29 | 1.59 | 23.1 | 14.7 | 58.03 |

PLA/Sulfonate Composites

Sulfonates, such as sodium benzenesulfonate (NaBS) and sodium dodecyl benzene sulphonate (NaDBS) are water soluble, thermally stable salts that blend well with polyesters. The extrusions of 2% or 8% NaBS or NaDBS in amorphous PLA 6060D resin at 160° C. were smooth. Table 5 presents the compositions of the degradable PLA/Sulfonate composites and their $T_g$ measured using DSC. The fact that the $T_g$ of the salt-filled composites was the same as the $T_g$ of the polymer matrix indicates minimum polymer thermal degradation during the compounding processes.

TABLE 5

The glass transition temperature of the salt-filled PLA composites

| Sample | Weight NaBS % | Weight NaDBS % | $T_{g1}$ (° C.) | $T_{g2}$ (° C.) |
|---|---|---|---|---|
| 6292011-6060-NaBS-1 | 2% | | 57.01 | 57.27 |
| 6292011-6060-NaBS-2 | 8% | | 54.60 | 57.07 |
| 6292011-6060-NaDBS-2 | | 2% | 54.93 | 57.10 |
| 6292011-6060-NaDBS-3 | | 8% | 55.60 | 57.24 |

$T_{g1}$: the glass transition temperature showed on the first scan of the DSC.
$T_{g2}$: the glass transition temperature showed on the second scan of the DSC.

Figure 4:
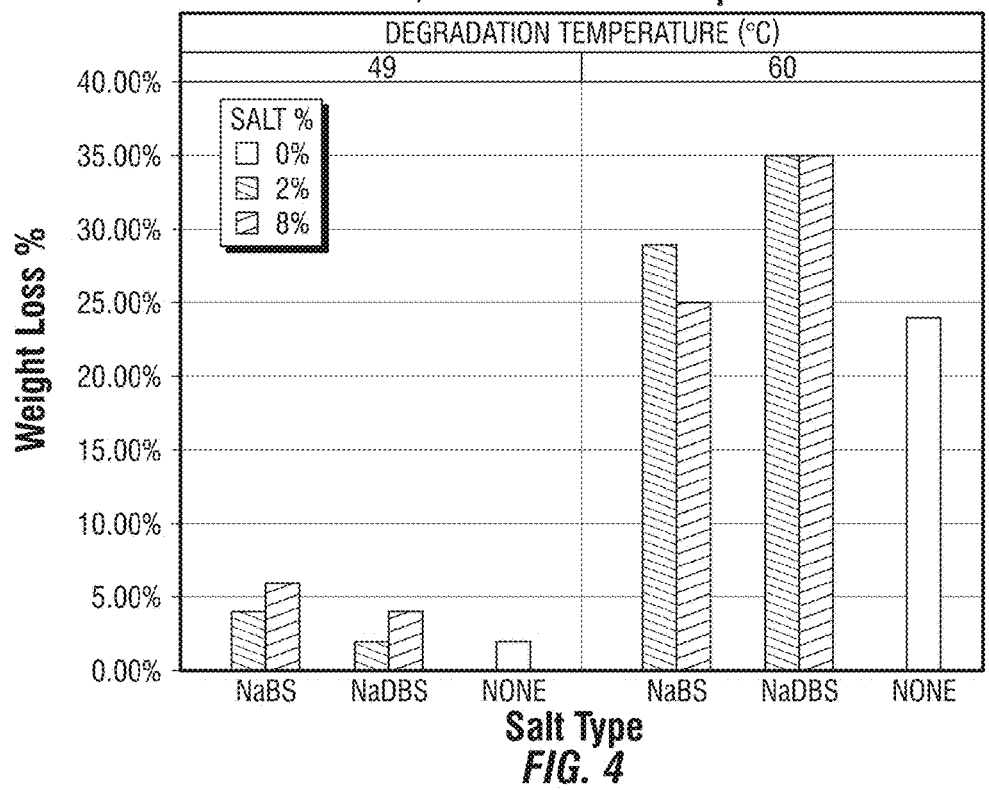
FIG. 4: Degradation results of the composite particles of PLA/Sulfonate salts after 14 days at 49° and 60° C. in water.

Compared to the pure PLA 6060D polymers, the 6060D/Sulfonate salts composites showed more total weight loss %, especially at 60° C. in water after 14 days of degradation (FIG. 4).

PLA/Wax Composites

Table 6 in FIG. 5 shows the compositions of PLA/wax particles that were made using the Haake MiniLab twin screw extruder. The resulting polymer rods were cut to around 6 mm long and were hot pressed to form around 0.3 mm thick films for further characterization.

The DSC curve for the 6060D/wax presents a single glass transition temperature slightly lower than the $T_g$ of the pure 6060D polymer (Table 6), which might be due to the plasticizing effect of the wax. The 6201D/1% wax showed the melting point of the wax at 54.76° C. and the $T_g$ of pure 6201D is at 61.31° C. The crystallinity % in the 6201D/wax blend was much higher than that of the hot pressed polymer film of the pure 6201D.

The water absorption of the hot pressed films can be characterized using the following equation: Water uptake %=$(W_w-W_d)*100\%/W_d$ where $W_w$ is the weight of the polymer film after staying in water at the defined temperature for the defined amount of time and then wiping off the surface water. $W_d$ is the weight of the film after drying at room temperature under vacuum overnight.

Figure 6:
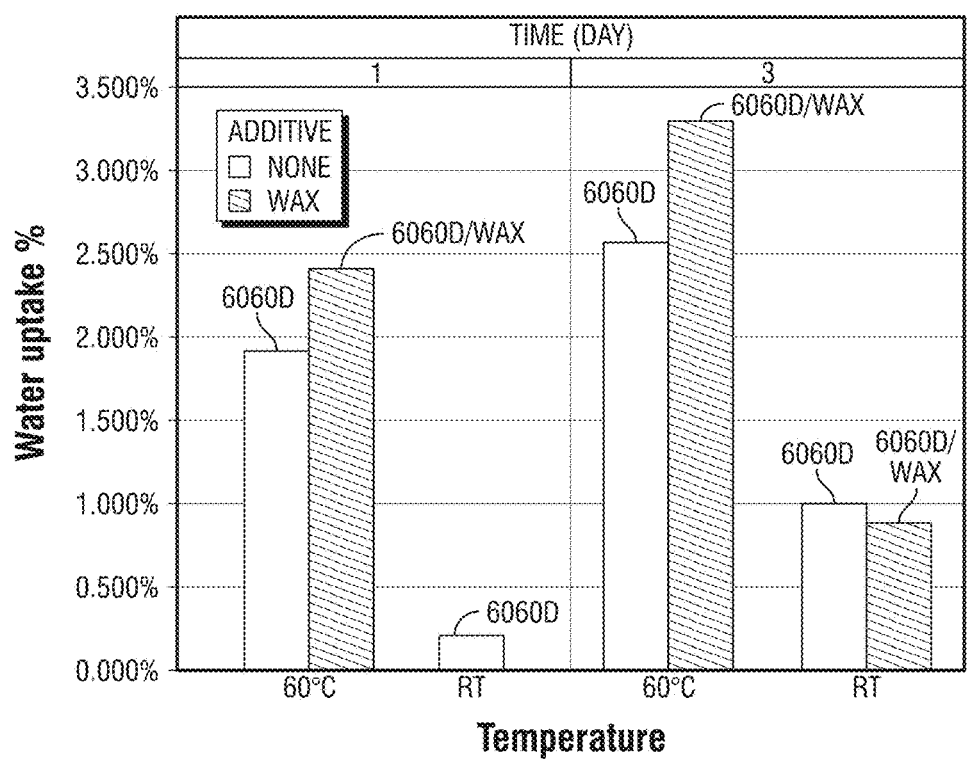
FIG. 6: Weight Loss % of PLA/wax blend vs. wax % in water. *: 6060D/wax at 60° C. for 14 days; $^\Delta$: 6201D/wax at 82° C. for 7 days.

FIG. 6 shows the water uptake % of the films in water at room temperature, 60° C. for 1 and 3 days, respectively. 6060D/1% wax films absorbed less water than 6060D films did at the room temperature but absorb more water at 60° C.

Figure 7:
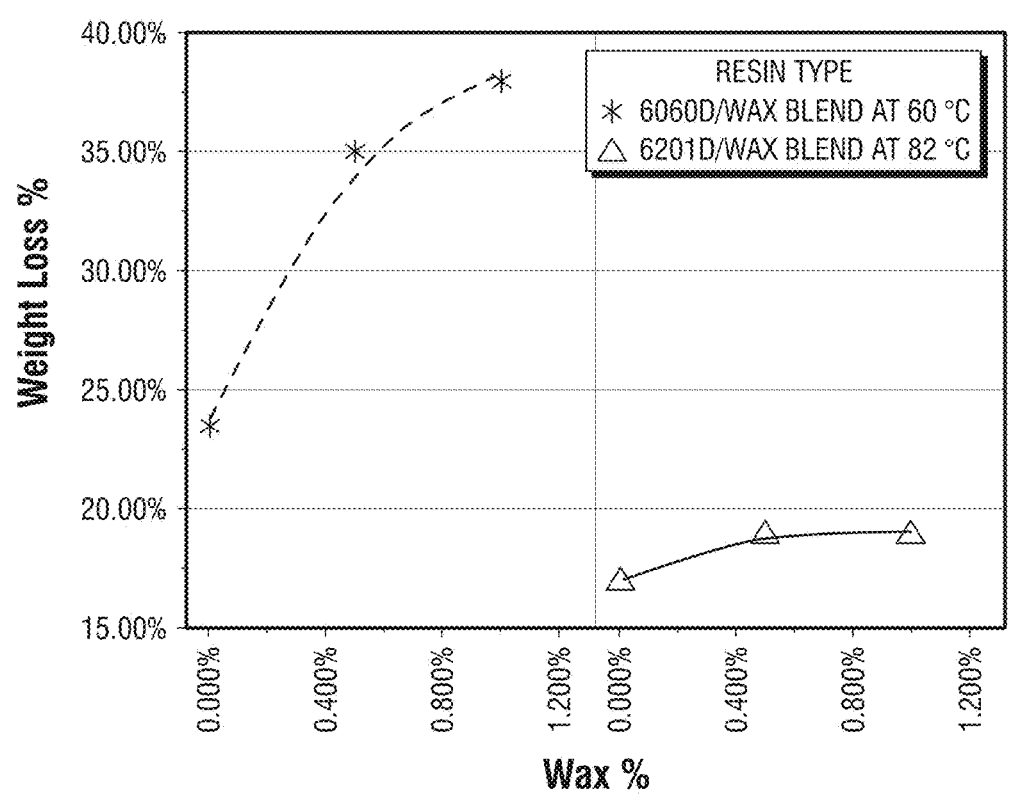
FIG. 7: DSC (2$^\#$ scan, 10° C./min) of 6060D/10% A4412 (A); 6060D/10% D2908 (B) blends; and 6060D/15% 6201D (C) blends. 2$^\#$ scan means the second heating cycle.

At 60° C. in water for 14 days, the 6060D/wax particles showed higher weight loss % (15% more weight loss %) compared to that of the 6060D resin at the same condition (FIG. 7). Higher weight loss was associated with higher wax loading in the 6060/wax particles. For the particles of semicrystalline 6201D PLA/wax, the weight loss % at 60° C. was not measurable because the degradation kinetics of semicrystalline PLA were too slow to result in measurable weight loss though the molecular weight of the polymer decrease as reported in the literature. At 82° C., the particles of semicrystalline PLA/wax (6201D/wax) showed a slightly higher degree of weight loss % compared to the degradation of pure 6201D resin at 82° C. (FIG. 7).

PLA/EVOH Blends

Poly(ethylene-co-vinyl alcohol) (EVOH) polymers are a family of semicrystalline random co-polymers with hydrophilic character that can be tuned by composition. EVOH with high vinyl alcohol content (>71 mol %) is more hygroscopic and can biodegrade under certain conditions. Two Soarnol® standard grade EVOH resins were chosen to be compounded with amorphous (6060D) and crystalline PLA (6201D), respectively. D2908 contains 29 mol % of ethylene with a melting point at 188° C., and A4412 contained 44% of ethylene with a melting point at 164° C. EVOH (D2908 or A4412) was loaded at 10% of total weight of PLA (6060D or 6201D) and EVOH. Table 7 in FIG. 8 lists the compositions of the polymer blends and the extrusion conditions.

Figure 9A:
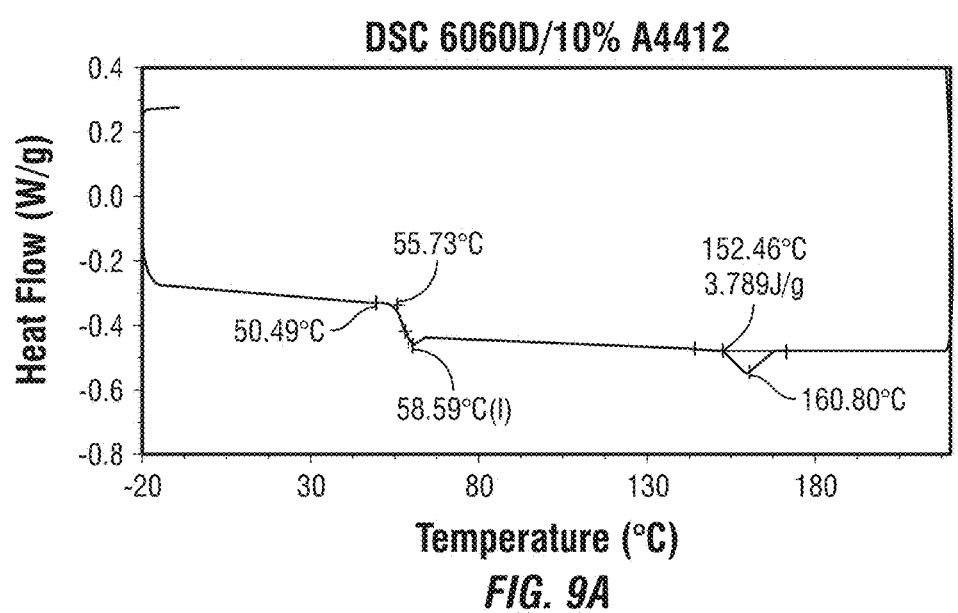
FIG. 9: Water uptake % for 6060D/A4412 blends.
Figure 9B:
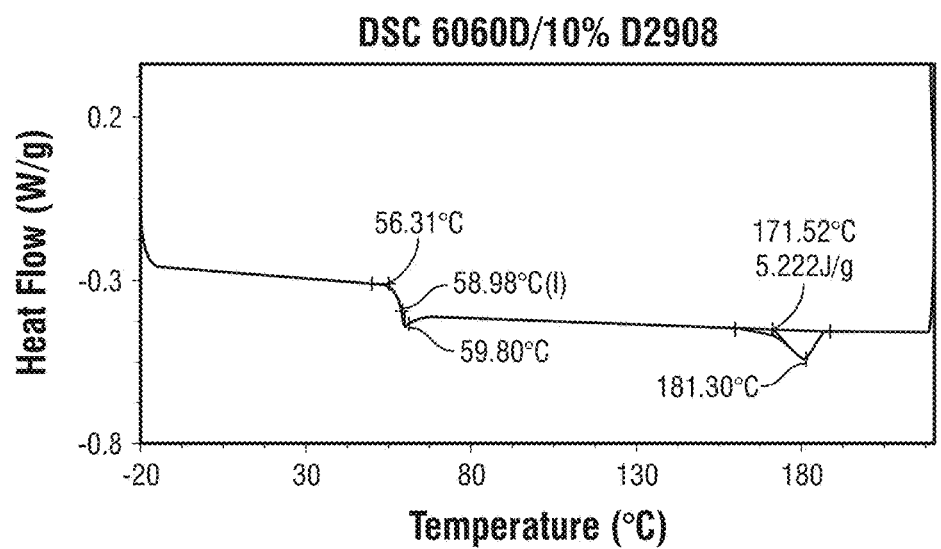
Figure 9C:
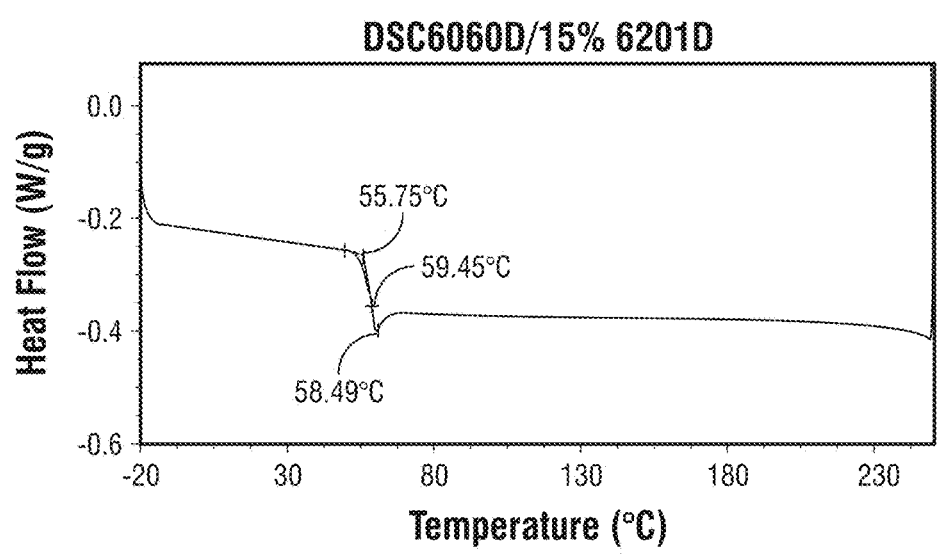

The extrusion was smooth, and the resulted polymer blends were white, opaque rods. When the rods were hot pressed to 0.33 mm thick films, the blend films were opaque (Table 7), different from the transparent film of pure PLA (6060D as an example). The opaqueness may be an indication of the formation of small EVOH droplets dispersed in the PLA matrix. The DSC studies showed a single $T_g$ at 58.59° C. and $T_m$ at 160.8° C. for 6060D/A4412 blend, and $T_g$ at 58.98° C. and $T_m$ at 181.30° C. for the 6060D/D2908 blend as shown in FIGS. 9A and 9B. 6060D/EVOH blends still maintained some crystallinity while the PLA blend of 6060D and 15% 6201D appeared to have lost the crystalline phase completely (FIG. 9C).

Figure 10:
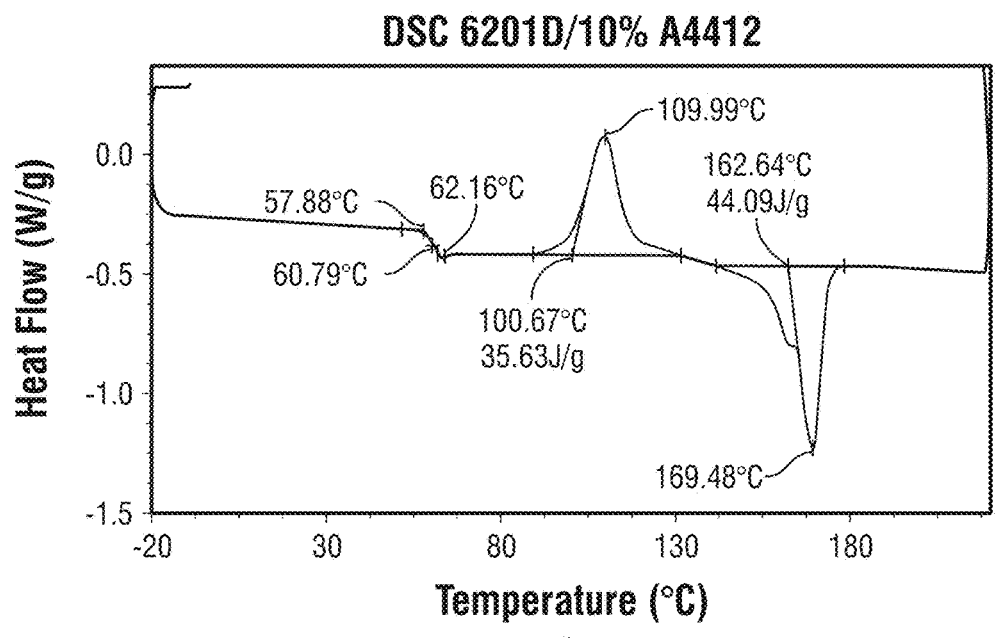
FIG. 10: Weight loss % for 6060D/10% EVOH blends at 82° C. for 7 days and at 60° C. for 14 days.

The crystalline phase of EVOH was depressed when EVOH was blended with semicrystalline PLA 6201D as shown in FIG. 8. The crystalline melting peak of A4412 was overlapped with the crystalline melting peak of 6201D (FIG. 10).

Figure 11:
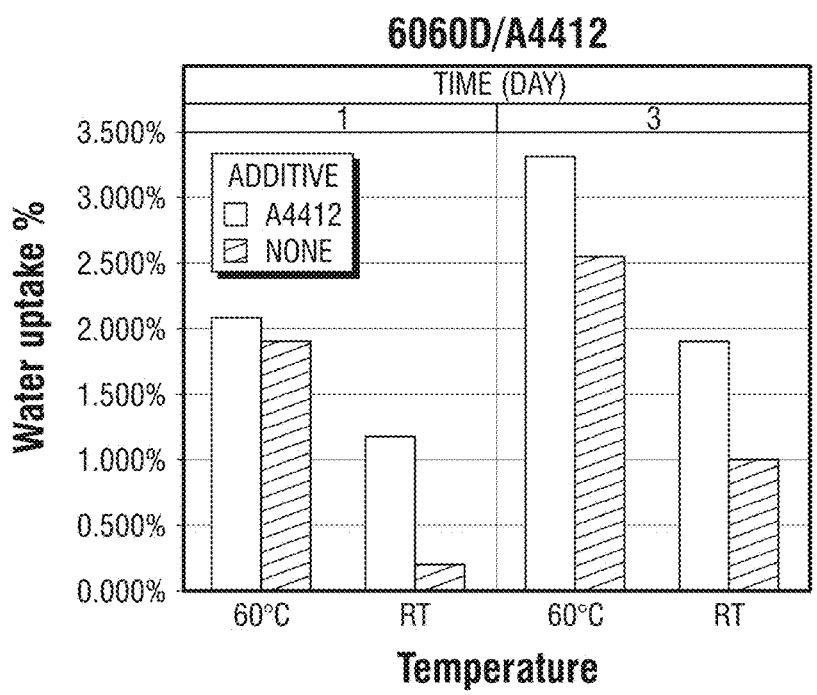
FIG. 11: 6060D/TH300 particles and fibers degrade at 60° C. for 14 days.

FIG. 11 shows the water uptake % of 6060D/A4412 film in water at room temperature (RT) and 60° C. for 1 and 3 days, respectively. At RT, the PLA/A4412 blend absorbed more water than pure PLA resin after 1 day and 3 days, probably due to the hydrophilic nature of EVOH A4412. At 60° C., the PLA/A4412 blend still absorbed more water than pure PLA but the difference was much smaller compared with the difference at RT.

Figure 12:
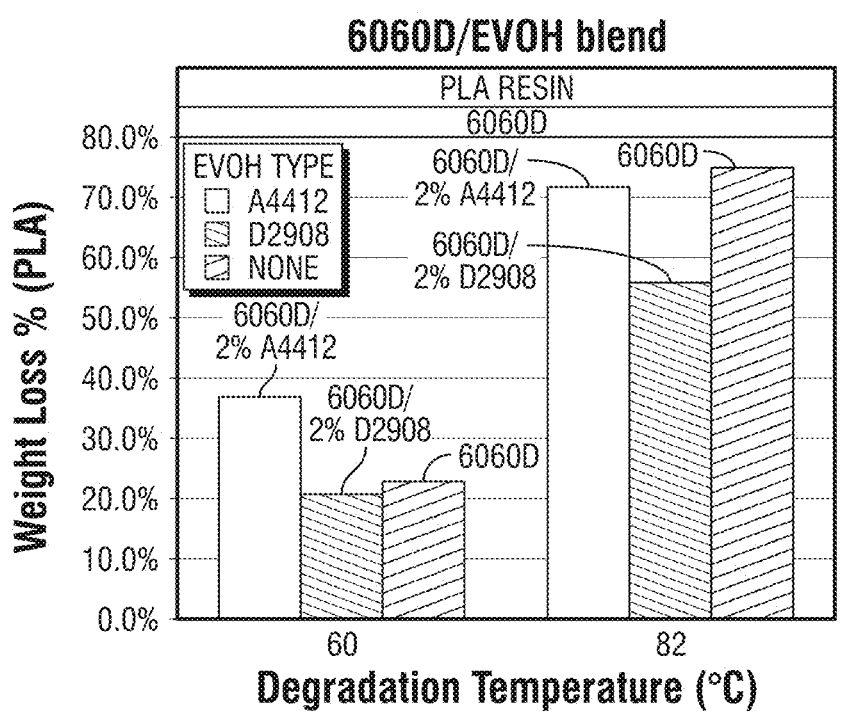
FIG. 12: DSC (A) of hydrolyzed MgO 170. (B) DSC curve of MgO 170s.

The degradation experiments of PLA/EVOH were conducted at 82° C. for 7 days, and at 60° C. for 14 days. The weight loss follows the trend of 6060D/A4412>6060D>6060D/D2908 at 60° C. (FIG. 12). The PLA/A4412 had higher weight loss than PLA/D2908 at 60° C., probably due to the right balance of hydrophilicity and crystallinity of A4412 resin. At 82° C., the weight loss % followed the trend as 6060D>6060D/A4412>6060D/D2908 (FIG. 12).

PLA/TH300 Blends

DuPont Biomax TH300 is a modifier with blend of polymer and wax for better thermal resistance when used in two-stage thermal forming process for films. Table 8 in FIG. 13 shows the compositions of PLA/TH300 blends and their extrusion temperatures. The extrusion was very smooth, and the resulted rods were hot pressed to form around 0.3 mm thick of films for further characterization.

Figure 14:
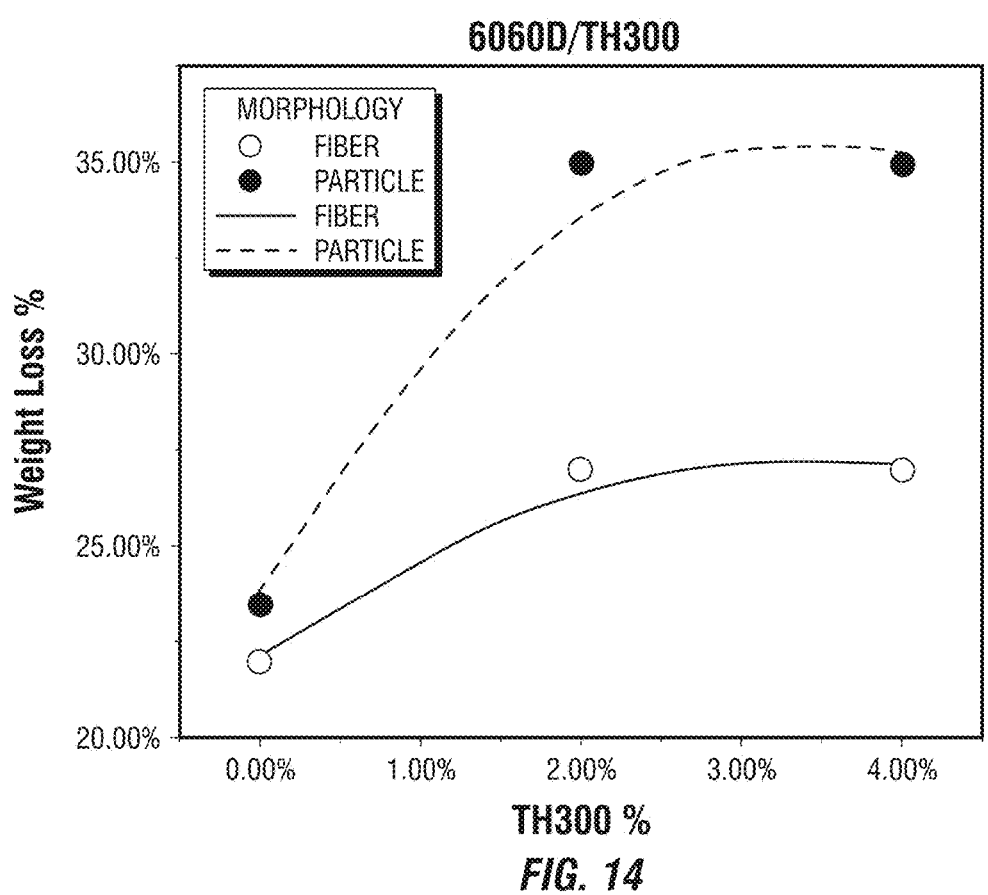
FIG. 14: The degradation profiles of 6060D/MgO 170 at 38° C. in water.

The PLA 6060D/TH300 fibers were melt spun using a Hill's pilot spin line. The spinneret temperature for spinning 6060D/TH300 was at 210° C., and the take-up speed was 500 m/m. The resulted filament was cut to 6 mm long fibers and was subjected to degradation at 60° C. in water. FIG. 14 shows the weight loss % of the 6060D/TH300 fibers and particles (6 mm in length and 1 mm in diameter) after 14 days at 60° C. in water. The fibers or the particles with 2% TH300 degraded faster than the pure 6060D fibers or particles, and adding more TH300 didn't result in more degradation. The fibers showed overall less weight loss % compared to the particles with the same compositions at the same degradation conditions.

Figure 15A:
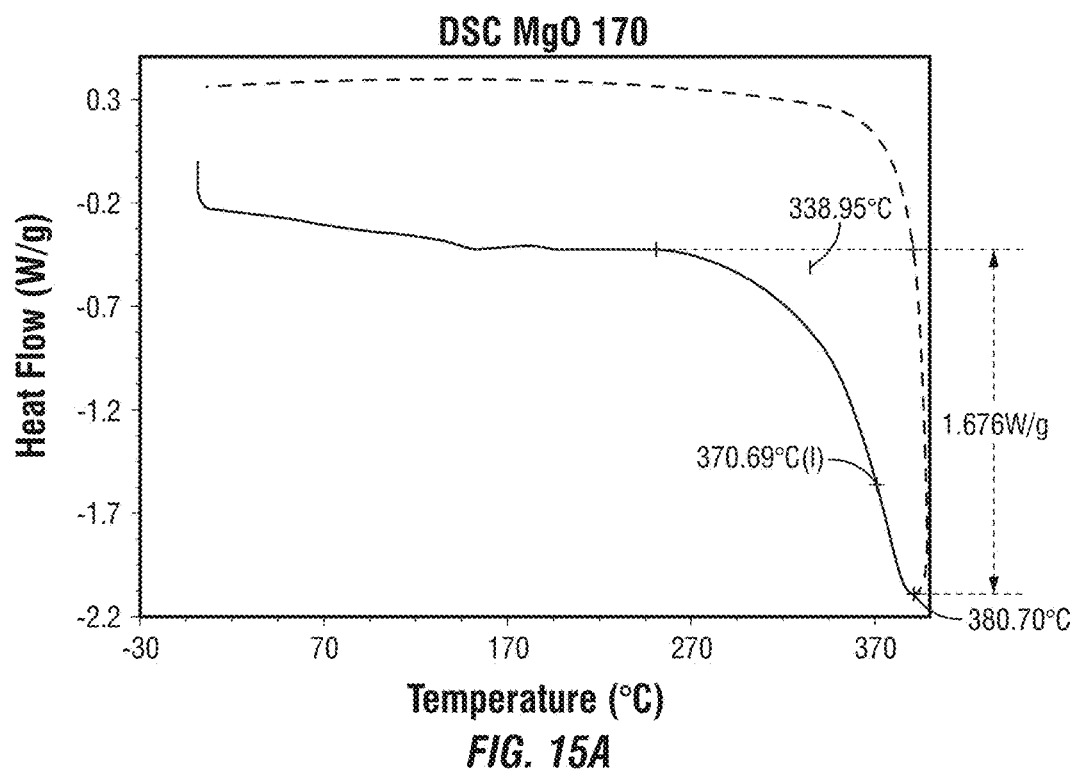
FIG. 15A-B (A) DSC curve of dried MgO Elastomag 170s (dash line) and 170s with Silquest A-1524 (solid line) (B) FTIR (absorption) of A-1524 on MgO 170s surfaces.
Figure 15B:
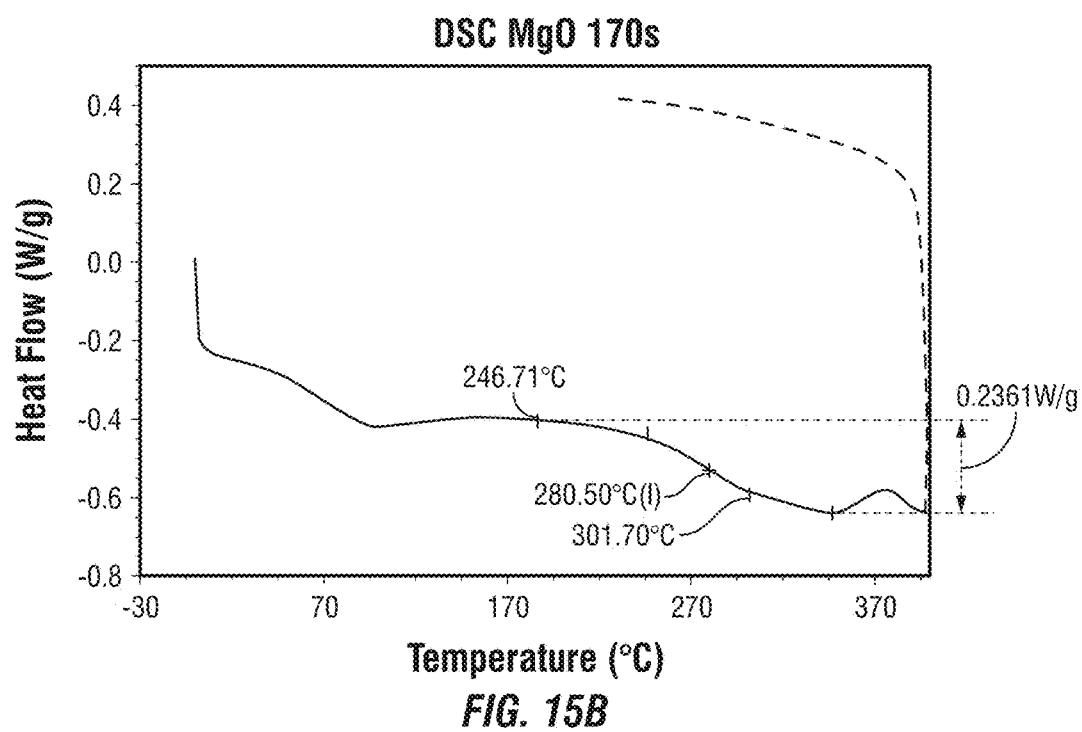

PLA/MgO Composites 6060D resins were compounded with two grades of MgO, Elastomag 170 (MgO 170) and Elastomag 170 special (MgO 170s). The MgO 170 consisted of aged samples that were partially hydrolyzed to form $Mg(OH)_2$. The DSC curve of the MgO 170 shows the endothermic peak at around 360° C. for the loss of the hydroxyl group in the brucite phase, indicating that MgO 170 contained hydrolyzed MgO (FIG. 15A). The DSC curve of MgO 170s (FIG. 15B) showed a typical scan of MgO with little brucite content, an anhydrous MgO.

The extrusion of MgO in 6060D PLA was conducted at 160° C. During extrusion, some polymers leached out from the gap of the extruder and the torque for some of the batches ran up to 360 Ncm. The torque was controlled below 120 Ncm. The composite came out as solid rods. Table 9 shows the compositions of the 6060D/MgO composite particles. $T_g$ of the PLA/MgO composites measured by DSC are at around 53° C., implying some degree of thermal degradation that resulted in a slightly lower $T_g$ compared to the $T_g$ of the pure PLA polymers.

TABLE 9

The compositions of PLA/MgO composite particles.

| Sample | Total (g) | 6060D (g) | MgO 170s (g) | MgO 170 (g) | Weight MgO % |
|---|---|---|---|---|---|
| 1212011-1 | 6.00 | 5.04 | | 0.96 | 16% |
| 1212011-2 | 5.00 | 4.20 | | 0.80 | 16% |
| 1212011-3 | 5.00 | 4.20 | 0.80 | | 16% |
| 1212011-4 | 5.00 | 4.20 | 0.80 | | 16% |
| 1212011-5 | 5.00 | 3.70 | | 1.30 | 26% |
| 1212011-6 | 5.00 | 3.70 | | 1.30 | 26% |
| 1212011-7 | 5.00 | 3.70 | 1.30 | | 26% |
| 1212011-8 | 5.00 | 3.70 | 1.30 | | 26% |
| 1212011-9 | 5.00 | 3.20 | | 1.80 | 36% |
| 1212011-10 | 5.00 | 3.20 | | 1.80 | 36% |
| 1212011-11 | 5.00 | 3.20 | 1.80 | | 36% |
| 1212011-12 | 5.00 | 3.20 | 1.80 | | 36% |

Figure 16A:
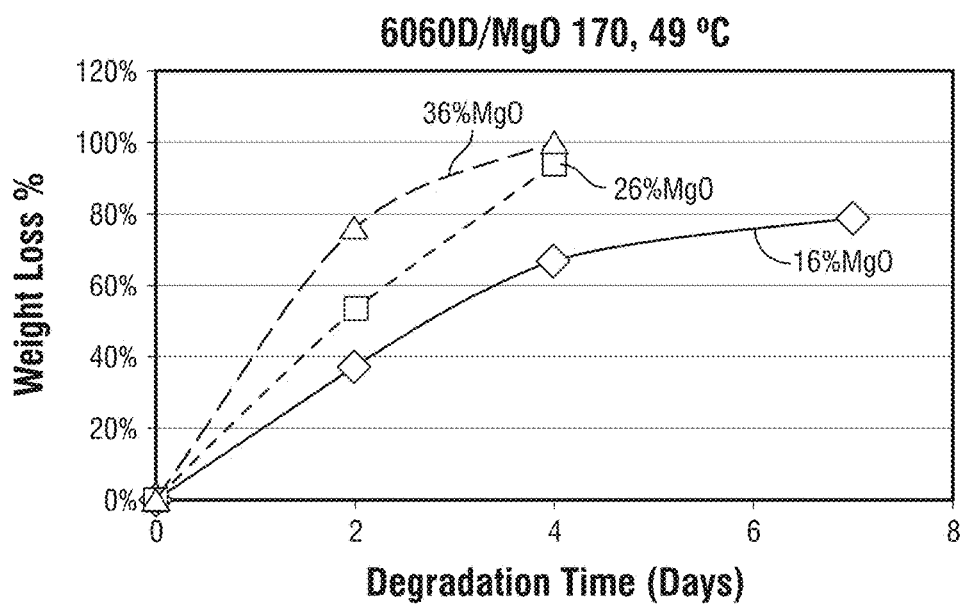
FIG. 16: The degradation of 6060D/16% MgO 170s at 49° C. with (solid) and without (dash) Silquest A-1524 coating.
Figure 16B:
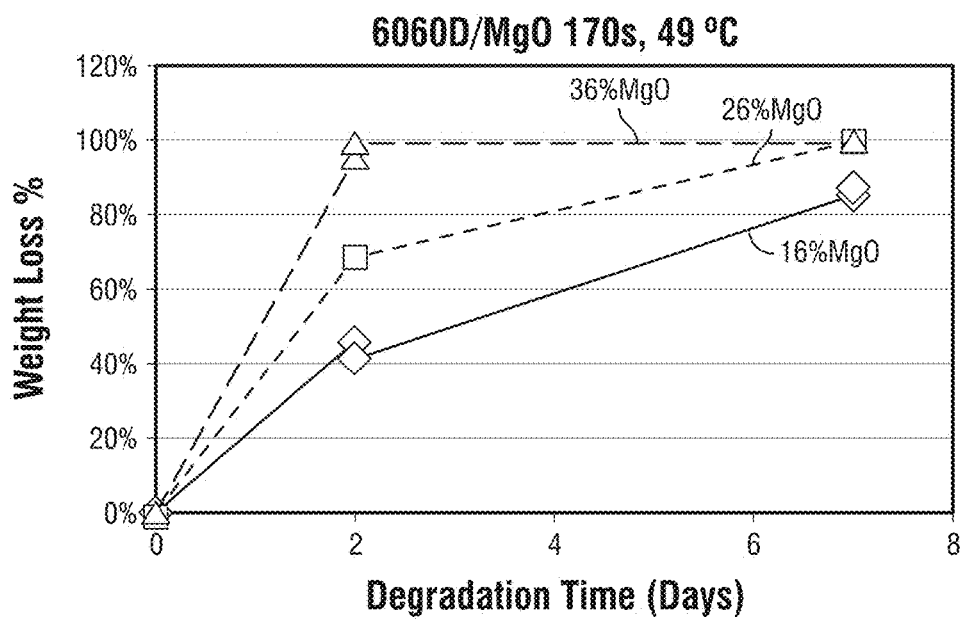
Figure 17:
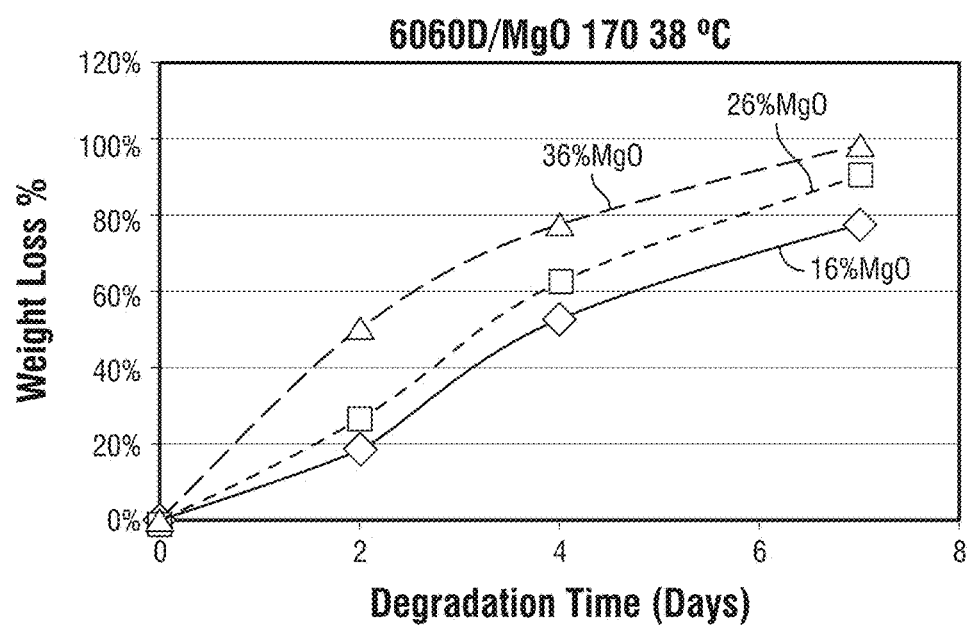
FIG. 17: TEM images of 9% ZnO in PLA 6060D. Average size of ZnO fillers: (A) 250 nm and (B) 40 nm.

Since about 22% of MgO loading is equivalent to the mole of PLA repeat units in the composite, and the loading of 36% MgO is excess to the mole amount of PLA repeat units, 5% HCl solution was used to wash the degradation residue to dissolve the residual $Mg(OH)_2$ and leave just the residual polymers. FIG. 16A shows the degradation profiles at 49° C. for the particles of 6060D/MgO 170 and MgO/170S, respectively. At 49° C., the particles with >26% MgO achieve 100% weight loss within 7 days. FIG. 17 shows the degradation profiles at 38° C. for the particles of 6060D/MgO 170. At both temperatures, a higher loading of MgO resulted in higher weight loss at the given degradation temperature and time (FIGS. 16 and 17).

Figure 18A:
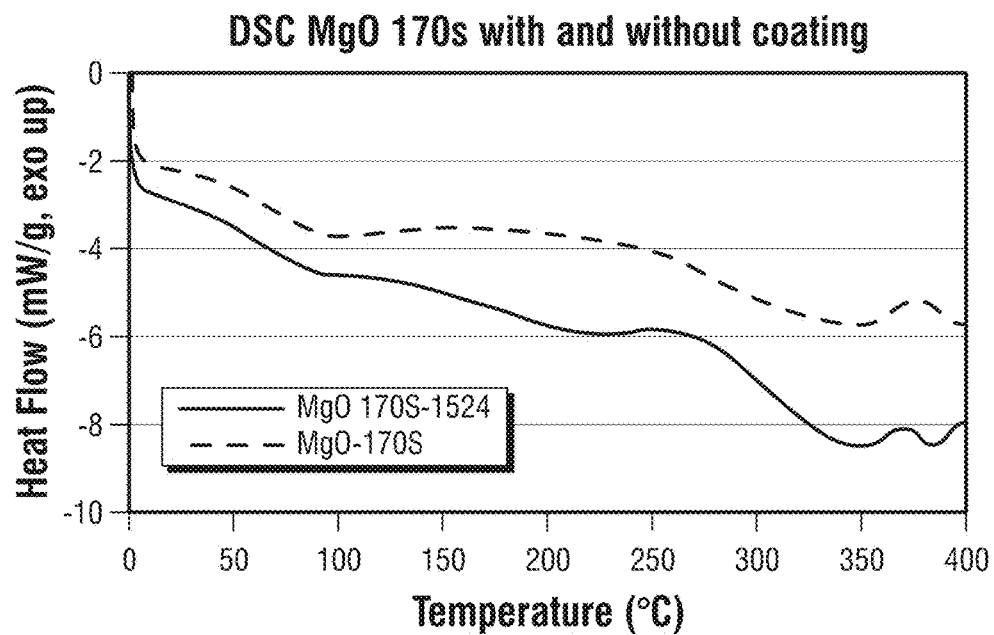
FIG. 18A-B: (A) Total weight loss % vs. degradation temperatures for 6060D/ZnO particles. (B) PLA loss (mmole) correlates to the total BET surface area of ZnO particles in the 6060D/ZnO composites.
Figure 18B:
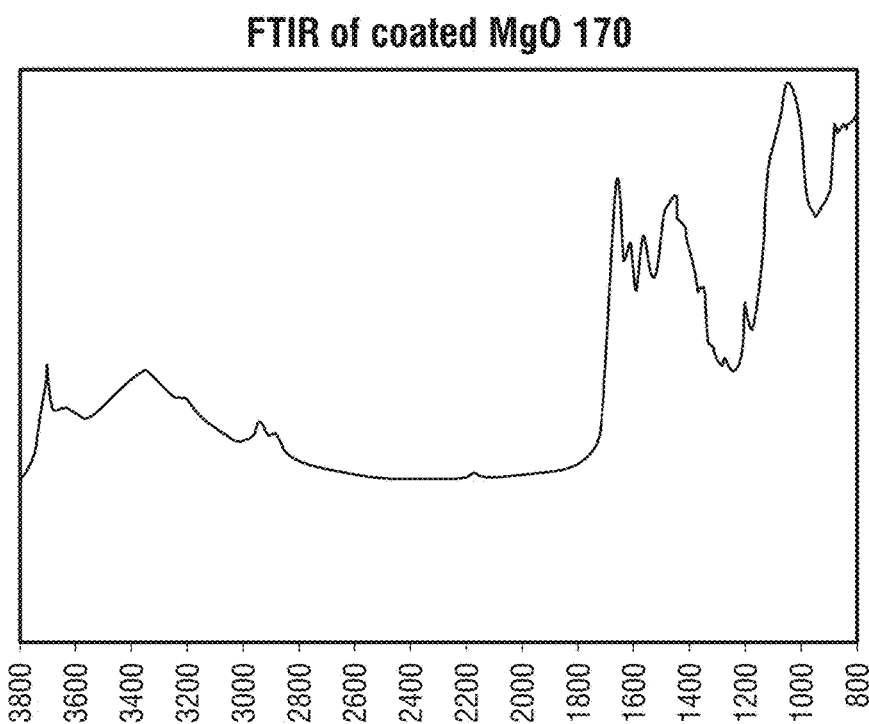

Since MgO is sensitive to hydrolysis, a silane coating was used to protect the surfaces of the MgO particles and the impact of the coating on the degradation behavior of 6060D/MgO 170s was further investigated. Silquest A-1524 (3-Ureidopropyltrimethoxysilane) was coated on MgO 170s surfaces. The coating was characterized using FTIR (ATR absorption) and DSC. FIG. 18 shows the DSC curve (18A) and the IR spectrum (18B) of the Silquest A-1524 coating on MgO surfaces.

Figure 19:
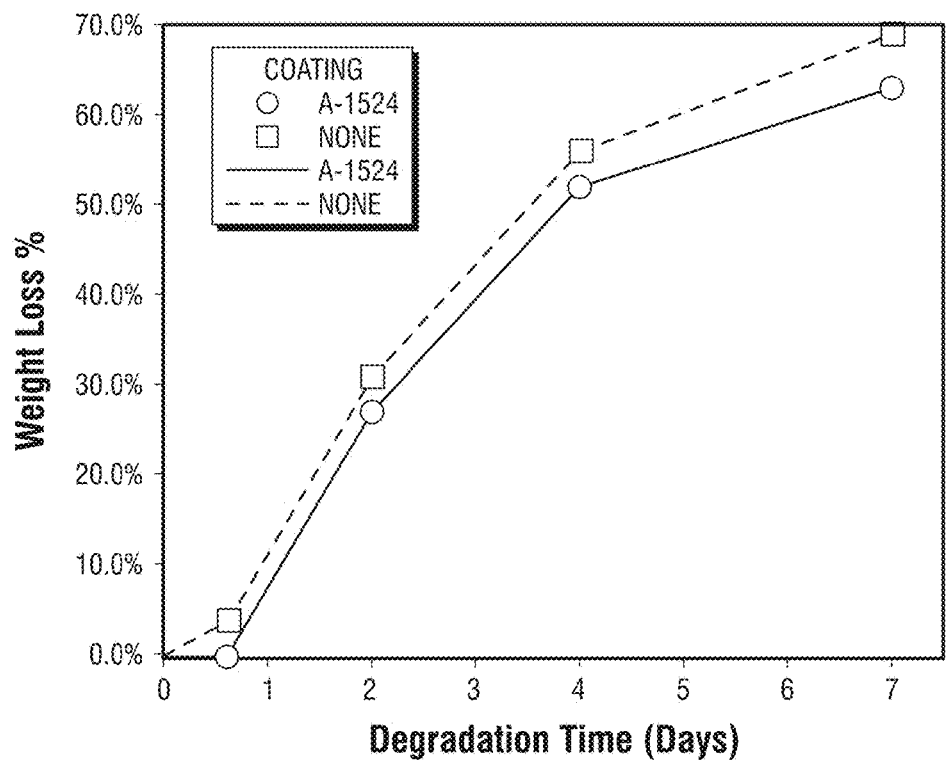
FIG. 19: Degradation results of PLA/ZnO/NaCl composite particles at 49° C. and 60° C. for 7 days. (A) 2% NaCl; (B) 10% NaCl.

DSC study of the coated MgO 170s (FIG. 18A) indicated that no significant MgO hydrolysis occurred during the coating process (in isopropanol). The IR spectrum of the coated MgO displays a carbonyl absorption at around 1650 $cm^{-1}$ (FIG. 18B), which is originated from the —N—CO— group on the 3-Ureidopropyltrimethoxysilane (A-1524). 6060D with coated MgO displayed a delayed degradation compared with the 6060D/MgO particles, indicating a time taken to hydrolyze the silane coating before the bulk degradation began (FIG. 19).

PLA/ZnO Composites

Figure 20A:
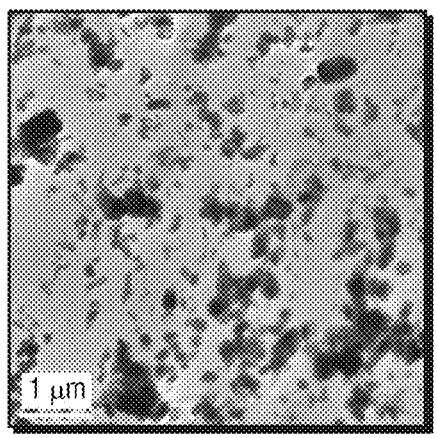
FIG. 20A-B (A) The contour plot of weight loss %, degradation temperature, and MgO % after 14 days in water. The contour plot of weight loss %, degradation time, and MgO % at 49° C. (B) and 60° C. (C).
Figure 20B:
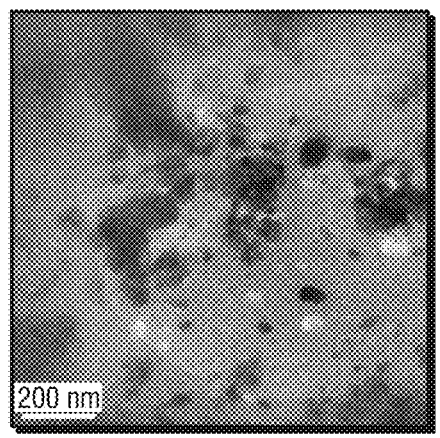

Two grades of ZnO were used as fillers in the PLA matrix. One is Acros ZnO powder from Fisher Scientific, with an average particle size of 250 nm (labeled as mZnO herein), and the other is ZnO nano particles from K Impex Corp. (labeled as nZnO), with an average particle size of 40 nm. FIG. 20 shows the Transmission Electron Microscopy (TEM) images of the PLA/9% ZnO composites. The Acros mZnO particles disperse well in the PLA (6060D), and the TEM image confirms that the size of the mZnO particles is in the range from around 100 to 500 nm (FIG. 20A). The TEM image of the PLA/nZnO (nano ZnO, 40 nm) indicates some aggregation of nano ZnO particles formed among the dispersed nano ZnO particles in the PLA matrix (FIG. 20B). The size of the nZnO was in the range of 20-80 nm. The glass transition temperature, $T_g$, of the PLA/ZnO composites was in the range of 54-57° C. (by DSC), which indicates little thermal degradation during the extrusion/compounding processes.

Figure 22A:
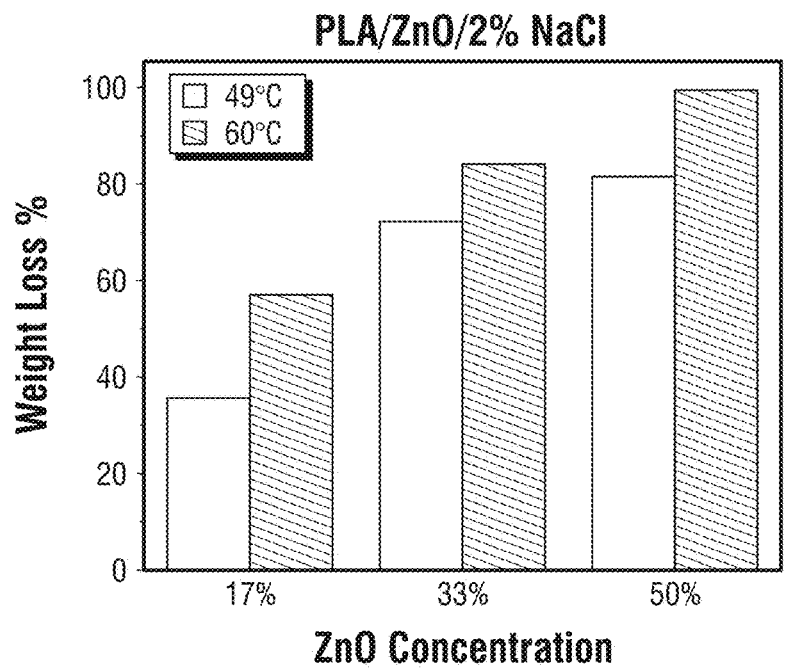
FIG. 22A-B. (A) An optical image of 6060D fiber made using pure 6060D resin. (B) An optical image of Fiber B6, 6060D/2% MgO composite fiber.
Figure 22B:
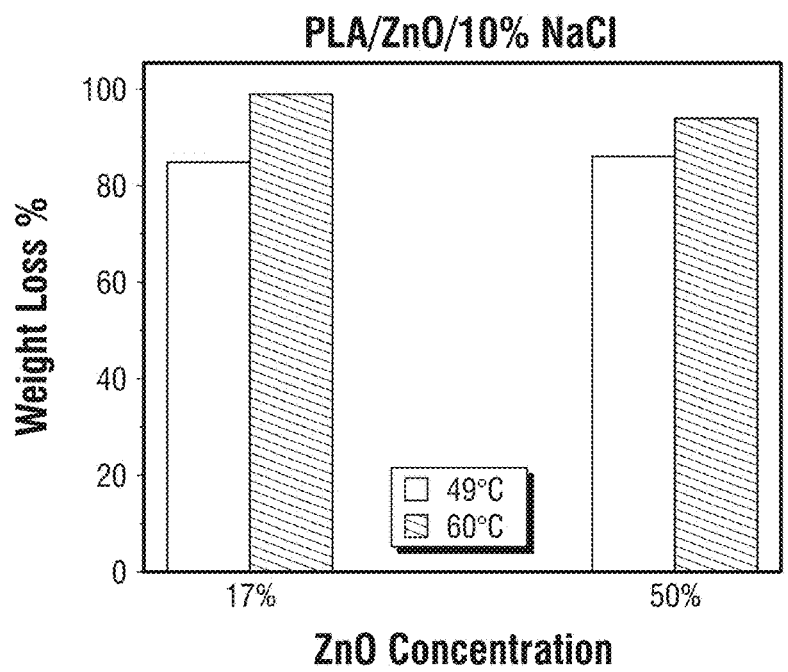

Table 10 shows the compositions of the PLA/ZnO composites and the degradation results at 38, 49 and 60° C. in water after 14 days. The total surface area of the fillers is measured using BET device. The device determines needed gas quantity to cover the sample surface with a molecular layer and calculates surface area using Brunauer, Emmett and Teller (BET) theory.

into the composites and further accelerate the degradation of the composites. Table 11 shows the compositions of the PLA/ZnO/NaCl composites. FIG. 22 presents the total weight loss % of the composites at 49 and 60° C. after 7 days in water. The plots for PLA/ZnO/10% NaCl (FIG. 22B) clearly shows much higher weight loss % than that of PLA/ZnO/2% NaCl (FIG. 22A).

TABLE 11

The compositions of PLA/ZnO/NaCl composites

| Sample | Weight NaCl % | Weight ZnO % | PLA 6060D (g) | NaCl (g) | ZnO (g) |
|---|---|---|---|---|---|
| 1 | 2 | 17 | 5.86 | 0.14 | 1.23 |
| 2 | 2 | 33 | 5.48 | 0.17 | 2.78 |
| 3 | 2 | 50 | 4.94 | 0.21 | 5.15 |
| 4 | 10 | 17 | 5.49 | 0.75 | 1.28 |
| 5 | 10 | 50 | 4.37 | 1.09 | 5.46 |

PLA/ZnO/MgO Composites

The compositions of PLA/ZnO/MgO composite particles are PLA (6060D)/10% mZnO/0.6% MgO or PLA (6060D)/10% mZnO/1.2% MgO (Elastermag 170). A three-factors, and three-levels of Design of Experiment (DOE) was developed using JMP software. The DOE includes MgO % (0-1.2%), degradation time (7-21 days) and degradation temperature (38-60° C.) as the factors with the ZnO % fixed at 10% in the composites. FIG. 23 shows the contour profiles

TABLE 10

The composition and the degradation results of PLA/ZnO composite particles

| Sample code | ZnO % by TGA | ZnO Size (nm) | Deg. temp. (° C.) | Degradation time (days) | Total weight loss % | pH of the filtration | Total ZnO BET surface area (m²) |
|---|---|---|---|---|---|---|---|
| 6212011-mZnO-1 | 36.00% | 250 | 60 | 14 | 100.0% | 4.50 | 0.825 |
| 6212011-mZnO-2 | 18.97% | 250 | 60 | 14 | 75.00% | 3.88 | 0.431 |
| 6212011-nZnO-1 | 35.21% | 40 | 60 | 14 | 100.0% | 4.83 | 2.769 |
| 6212011-nZnO-2 | 19.71% | 40 | 60 | 14 | 72.92% | 3.85 | 1.547 |
| 6060D control | | | 60 | 14 | 23.27% | 3.18 | 0 |
| 6212011-mZnO-1 | 36.00% | 250 | 49 | 14 | 31.25% | 5.53 | 0.825 |
| 6212011-mZnO-2 | 18.97% | 250 | 49 | 14 | 18.75% | 5.51 | 0.431 |
| 6212011-nZnO-1 | 35.21% | 40 | 49 | 14 | 85.42% | 5.26 | 2.769 |
| 6212011-nZnO-2 | 19.71% | 40 | 49 | 14 | 52.08% | 5.07 | 1.547 |
| 6060D control | | | 49 | 14 | 2.08% | 4.14 | 0 |
| 6212011-mZnO-1 | 36.00% | 250 | 38 | 14 | 16.67% | 5.48 | 0.825 |
| *6212011-mZnO-2 | 18.97% | 250 | 38 | 14 | 6.25% | 6.40 | 0.431 |
| *6212011-nZnO-1 | 35.21% | 40 | 38 | 14 | 45.83% | 5.49 | 2.769 |
| 6212011-nZnO-2 | 19.71% | 40 | 38 | 14 | 20.83% | 5.57 | 1.547 |

Figure 21A:
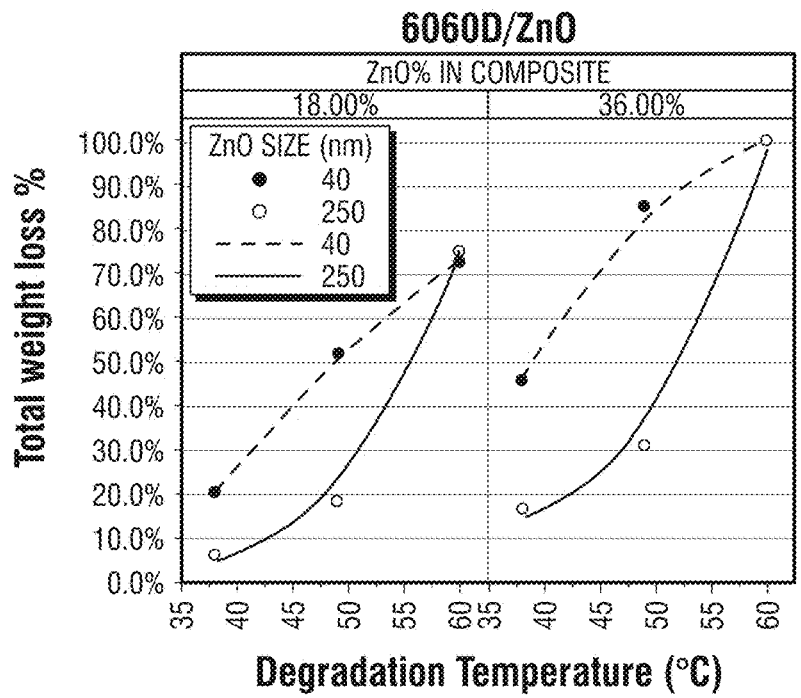
FIG. 21 The contour profile of weight loss %, degradation time and Zinc Octanoate (ZnOct) % at 49° C. in water.
Figure 21B:
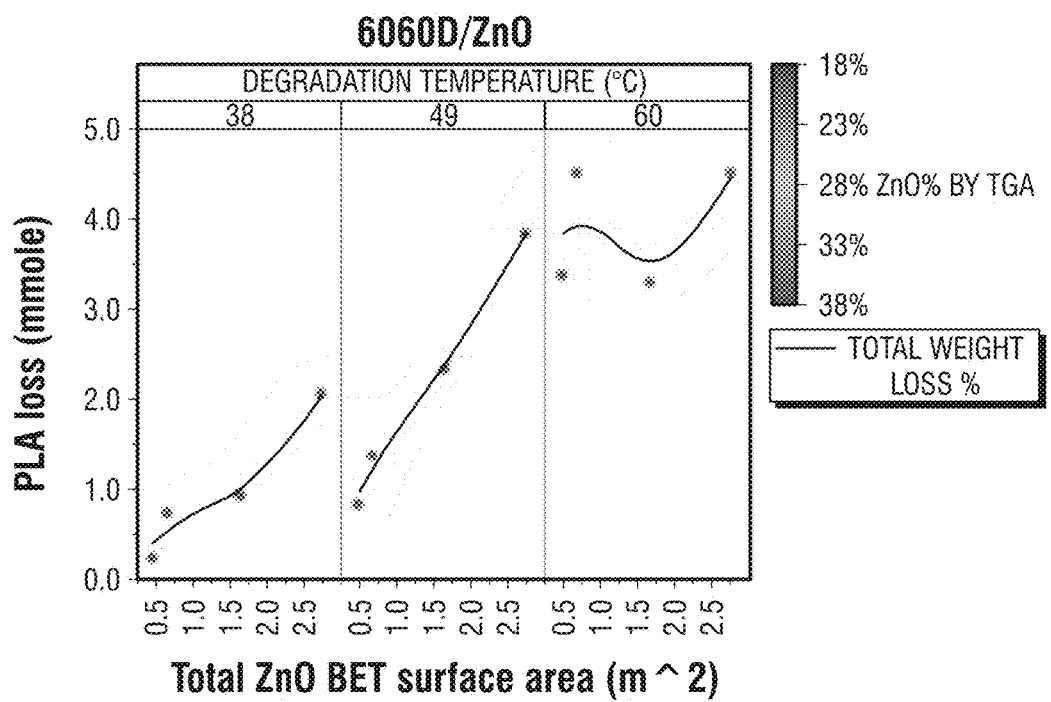

As shown in Table 10, all the PLA/ZnO composites had significantly more total weight loss % than that of the pure PLA 6060D polymer at the same degradation conditions. At 38 and 49° C., the PLA/nZnO composites degrade more than the PLA/mZnO composites (FIG. 21A), and the degradation correlates linearly with the total BET surface area of ZnO particles in the composites (FIG. 21B), an indication of the characteristic of heterogeneous catalysis. At 60° C., the degradation only correlates with the total loading of ZnO in the composites (FIG. 21B).

PLA/ZnO/NaCl Composites

Introducing a small amount of hygroscopic salts into PLA/ZnO composite could accelerate the water penetration of the total weight loss %, degradation temperatures, degradation time, and MgO % loading in the composites based on the results of the DOE.

Figure 23A:
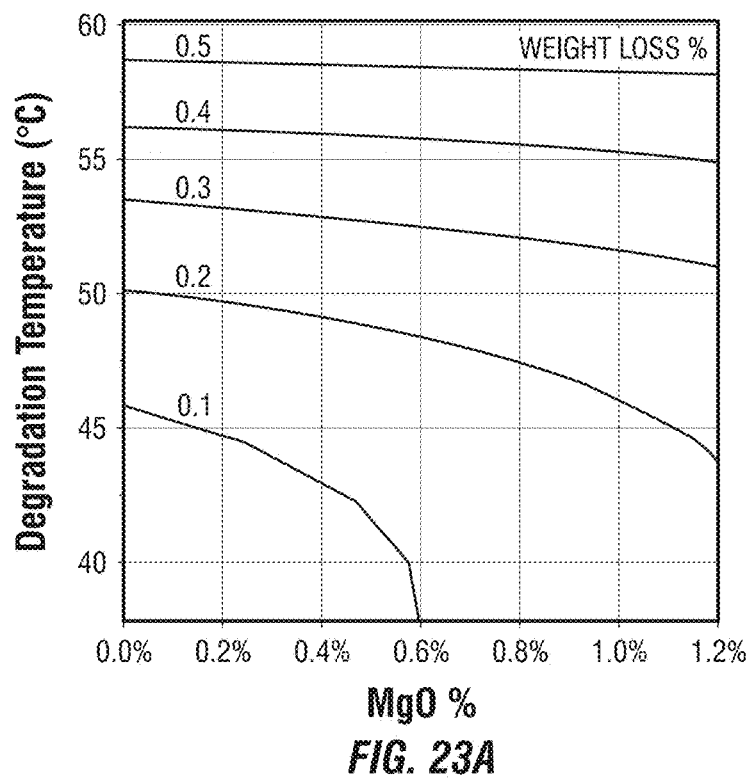
FIG. 23A-C. Optical images of PLA/ZnO fibers. (A) Fiber A12: 4%, (B) Fiber A2: 2% and (C) Fiber A22: 6% ZnO.
Figure 23B:
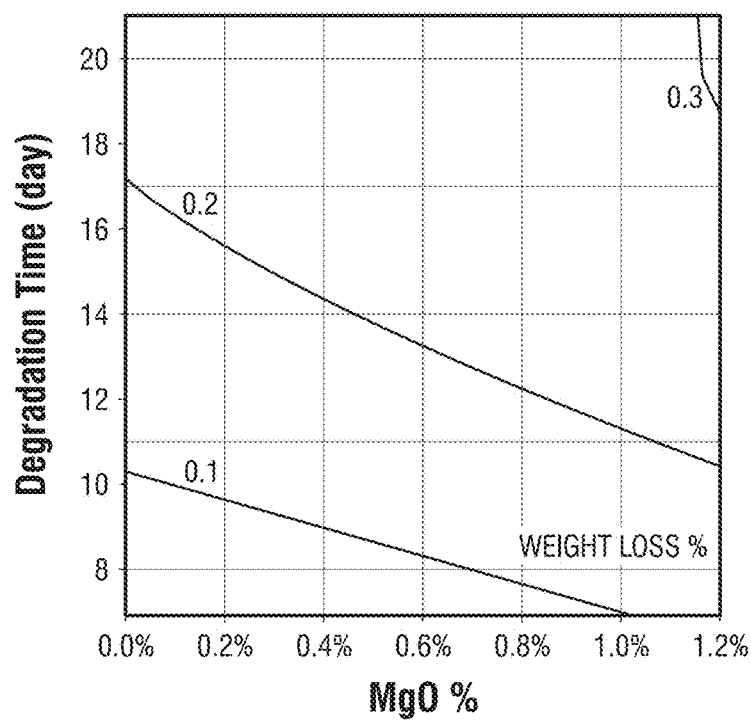
Figure 23C:
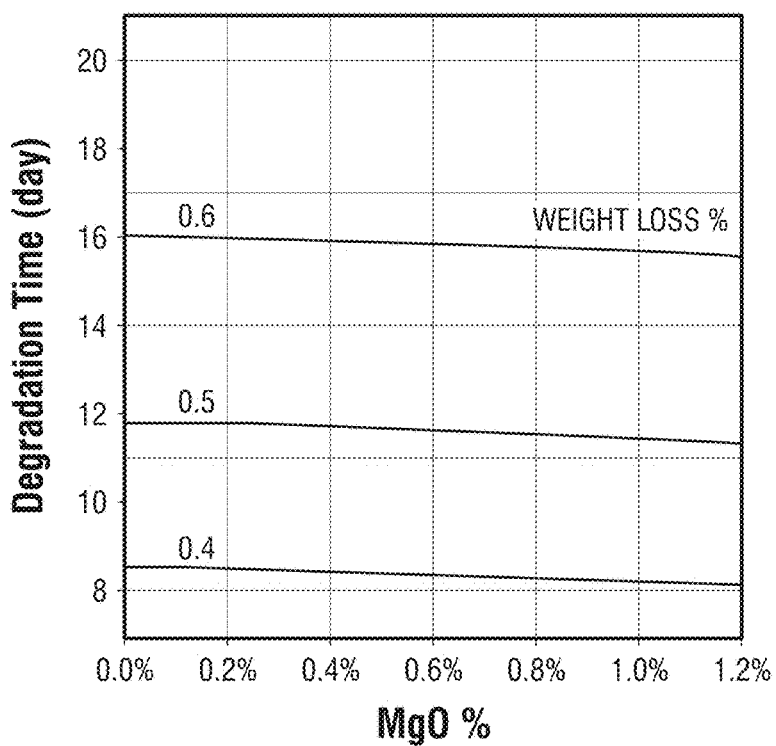

The addition of MgO accelerates the degradation at temperatures below 55° C. as shown in the curved contour lines in FIG. 23A at T<55° C. At temperatures above 55° C., the contour lines of weight loss % after 14 days of degradation is quite flat over the range of MgO %, an indication of lacking correlation between the MgO % and the weight loss % in this temperature range. The trend is obviously shown in the difference of the contour lines of the weight loss %, degradation time and MgO % between 49° C. (FIG. 23B with curved contour lines) and 60° C. (FIG. 23C with flat contour lines).

PLA/ZnO/ZnOCT Composites

Figure 24:
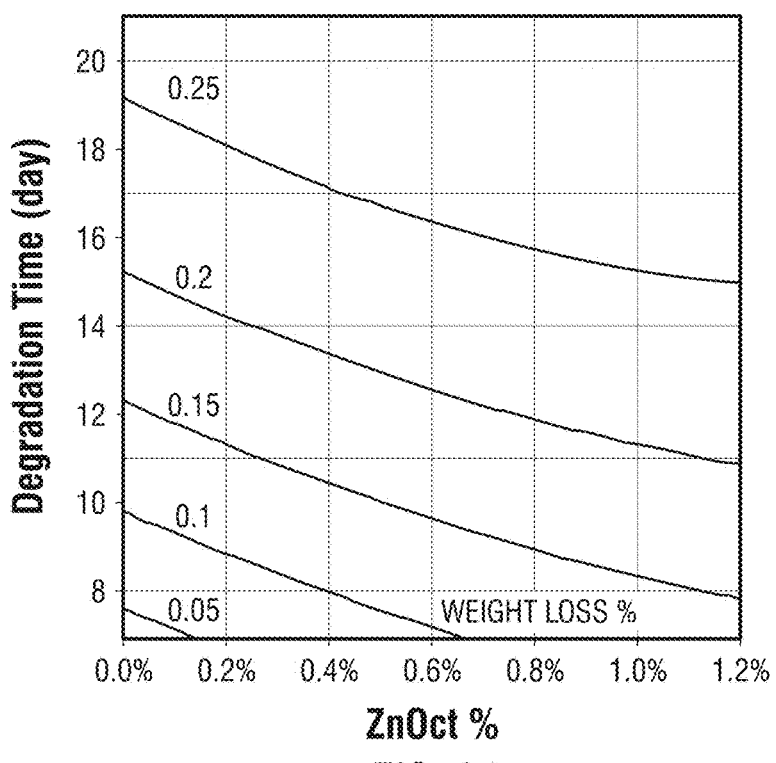
FIG. 24: (A) the degradation results of PLA/ZnO composite fibers. (B) the degradation results of PLA/MgO composite fibers. In all cases, the more reactive filler is added, the faster the degradation rate is.

Two compositions of PLA/ZnO/ZnOctonoate were evaluated: one is PLA(6060D)/10% ZnO/0.6% ZnOctonoate (ZnOct) and the other is PLA(6060D)/10% ZnO/1.2% ZnOct. A three-factors, and three-levels of Design of Experiment (DOE) was developed using JMP software. The DOE includes ZnOct % (0-1.2%), degradation time (7-21 days) and degradation temperature (38-60° C.) as the factors with the ZnO % fixed at 10% in the composites. FIG. 24 presents the contour profiles of weight loss %, degradation time, and ZnOct % at 49° C., which shows that less degradation time is required to reach the same weight loss % with higher loading of ZnOct %.

PLA/ZnO AND PLA/MgO Composite Fibers

Figure 25A:
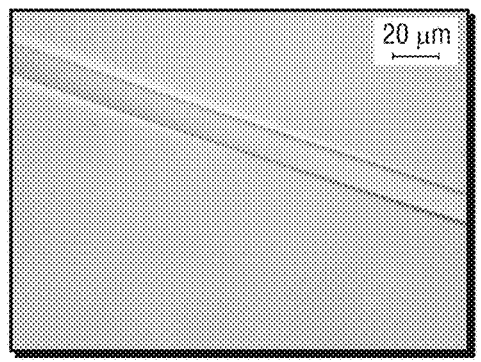
FIG. 25A-B: depict optical images of non-filled and composite fibers.
Figure 25B:
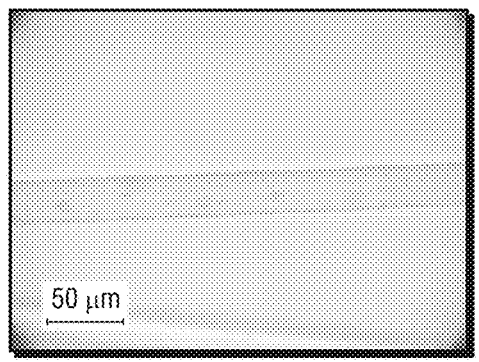
Figure 26A:
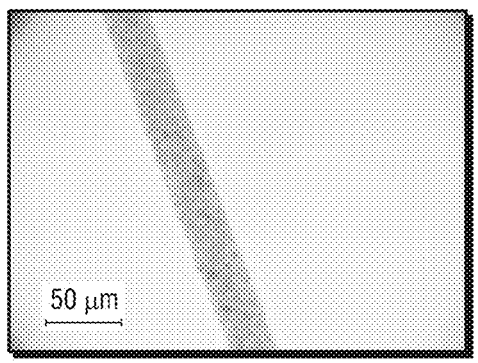
FIG. 26A-C: depict ZnO particles at 6% loading.
Figure 26B:
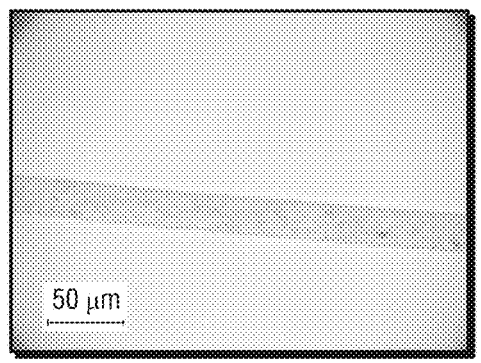
Figure 26C:
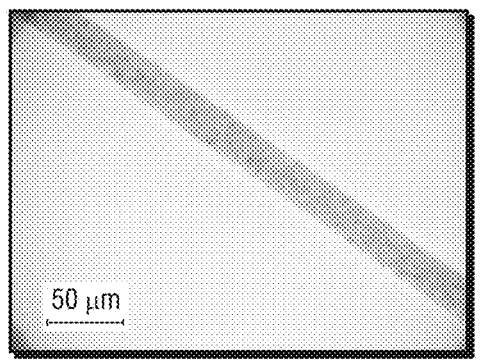

Table 12 shows the compositions of PLA/ZnO and PLA/MgO (170) fibers and their corresponding spinning conditions, diameters, and tensile strength. The optical images of 6060D fibers (non-filled) and the PLA/MgO and PLA/ZnO composite fibers are shown in FIGS. 25 and 26. The ZnO particles were dispersed well and filled the whole fiber even at 6% loading (FIG. 26C). Thermal degradation during the spinning of PLA/MgO fibers caused fiber breakage and blocking of the screen. MgO was only loaded up to 4% in the fibers.

TABLE 12

The spinning condition, the diameter and the tenacity of ZnO and MgO filled 6060D composite fibers

| ID | Resin Type | Filler % | Filler Type | Spinning temp | Through put (ghm) | Spinning Speed (m/m) | Mean Diameter (um) | Mean Diameter Std. dev. | Tenacity (Mpa) | Tenacity Std dev. | Mean Peak strain (%) | Peak strain (Std. dev.) |
|---|---|---|---|---|---|---|---|---|---|---|---|---|
| 6060D-#1 | A6060 | 0% | None | 230 | 0.5 | 2000 | 17.15 | 0.69 | 276 | 37 | 111 | 12 |
| 6060D-#2 | A6060 | 0% | None | 230 | 0.3 | 2000 | 13.58 | 0.63 | 245 | 20 | 87 | 15 |
| 6060D-#3 | A6060 | 0% | None | 220 | 0.5 | 2000 | 17.36 | 1.84 | 361 | 109 | 123 | 15 |
| 6060D-#4 | A6060 | 0% | None | 220 | 0.3 | 2000 | 12.71 | 1.13 | 388 | 102 | 78 | 12 |
| 6060D-#5 | A6060 | 0% | None | 210 | 0.5 | 2000 | 16.71 | 1.14 | 298 | 39 | 93 | 21 |
| 6060D-#6 | A6060 | 0% | None | 210 | 0.3 | 2000 | 13.11 | 1.07 | 357 | 42 | 67 | 11 |
| 6060D-#7 | A6060 | 0% | None | 200 | 0.5 | 2000 | 16 | 1.27 | 298 | 42 | 74 | 17 |
| 6060D-A-1 | A6060 | 2% | ZnO | 185 | 0.5 | 500 | 38 | 5.9 | | | | |
| 6060D-A-2 | A6060 | 2% | ZnO | 185 | 0.5 | 1000 | 25 | 2.8 | 198.7 | 27 | 107.7 | 14.2 |
| 6060D-A-5 | A6060 | 2% | ZnO | 205 | 0.5 | 500 | 34 | 2.3 | 63.5 | 19.1 | 44.7 | 89.9 |
| 6060D-A-6 | A6060 | 2% | ZnO | 205 | 0.5 | 1000 | 23 | 3.2 | | | | |
| 6060D-A-9 | A6060 | 4% | ZnO | 185 | 0.5 | 500 | 35 | 3.1 | | | | |
| 6060D-A-10 | A6060 | 4% | ZnO | 185 | 0.5 | 1000 | 25 | 4.4 | | | | |
| 6060D-A-11 | A6060 | 4% | ZnO | 195 | 0.5 | 500 | 34 | 3.3 | 41.6 | 4 | 2.83 | 0.6 |
| 6060D-A-12 | A6060 | 4% | ZnO | 195 | 0.5 | 1000 | 25 | 1.4 | 140.2 | 46 | 128.5 | 80.9 |
| 6060D-A-17 | A6060 | 6% | ZnO | 185 | 0.5 | 500 | 33 | 5 | 142.5 | 34.4 | 257.08 | 33.55 |
| 6060D-A-18 | A6060 | 6% | ZnO | 185 | 0.5 | 1000 | 26 | 2.4 | | | | |
| 6060D-A-21 | A6060 | 6% | ZnO | 205 | 0.5 | 500 | 34 | 4.2 | | | | |
| 6060 D-A-22 | A6060 | 6% | ZnO | 205 | 0.5 | 1000 | 24 | 2.7 | 103.1 | 9 | 236.29 | 24.47 |
| 6060D-B-1 | A6060 | 2% | MgO 170 | 185 | 0.5 | 500 | 36 | 4.6 | 118.3 | 16.3 | 193.43 | 113.94 |
| 6060D-B-2 | A6060 | 2% | MgO 170 | 185 | 0.5 | 1000 | 23 | 3.9 | 188.4 | 38.1 | 113.61 | 21.88 |
| 6060D-B-5 | A6060 | 2% | MgO 170 | 205 | 0.5 | 500 | 31 | 5.1 | 59.3 | 23.9 | 7.1 | 5.26 |
| 6060D-B-6 | A6060 | 2% | MgO 170 | 205 | 0.5 | 1000 | 22 | 4.1 | | | | |
| 6060D-B-9 | A6060 | 4% | MgO 170 | 185 | 0.5 | 500 | 36 | 4.9 | 75.9 | 26 | 221.33 | 71.66 |
| 6060D-B-10 | A6060 | 4% | MgO 170 | 185 | 0.5 | 1000 | 26 | 6 | 54.4 | 11.2 | 59.6 | 53.02 |
| 6060D/6201D 40% | 6060/6201 | 0 | None | 215 | 0.5 | 2000 | 18.7 | 1.8 | 261.4 | 38.1 | 112.51 | 8 |
| 6060D/6201D 20% | 6060/6201 | 0 | None | 215 | 0.5 | 2000 | 18.3 | 1.6 | 296.9 | 70.5 | 116.56 | 27.2 |
| 6060D/6201D B2 | 6060D/6201D | 2% | MgO 170 | 205 | 0.5 | 2000 | 18.8 | 2.2 | 208.4 | 17.7 | 138.65 | 11.5 |

The diameters of the pure amorphous 6060D fibers are in the range of 12-18 µm (Table 12, #1-#7), and the diameters of PLA(6060D)/ZnO and PLA(6060D)/MgO composite fibers (Fiber 6060D-A series and 6060D-B series) are in the range of 20-37 µm. The diameters of the fibers are determined by the spinning speed (m/m) and the throughput (ghm).

The tenacity of the non-filled pure 6060D fibers is significantly higher than that of the filled composite fibers (Table 12).

Figure 27A:
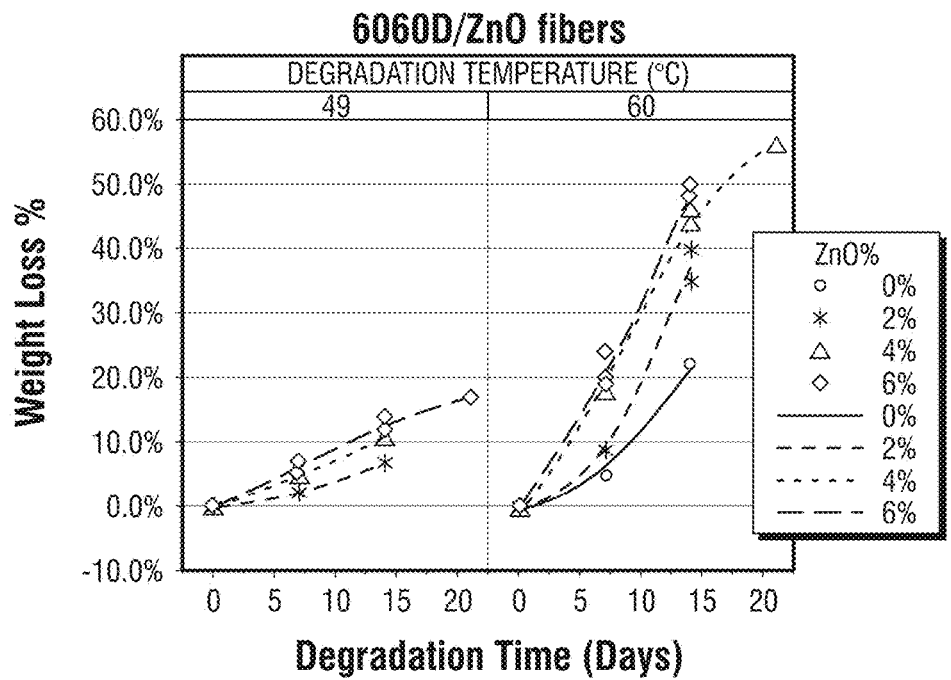
FIG. 27A-B: presents the degradation results of composite fibers.
Figure 27B:
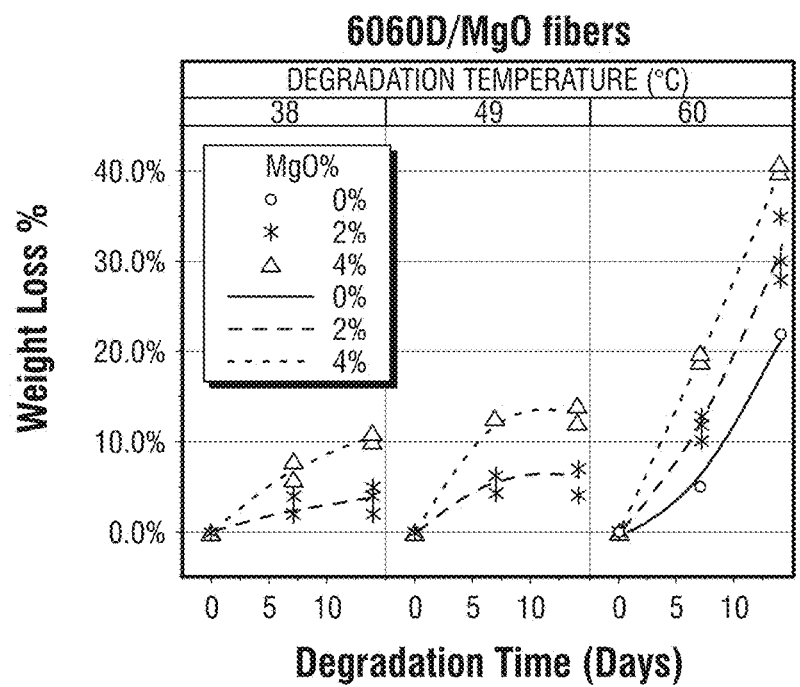

FIG. 27 presents the degradation results of the PLA/ZnO and PLA/MgO composite fibers. Consistent with the weight loss % trend of the composite particles, all the composite fibers showed higher weight loss % than that of the pure PLA 6060D fibers at temperature ≤60° C. (the weight loss % of pure 6060D fibers are less than 2% at the temperatures of 49 and 38° C.). More weight loss % was associated with higher loading of ZnO or MgO in the fibers at the same degradation condition for all the temperatures tested.

In summary, a great number of degradable composites have been presented that have very short degradation times. Further, we have exemplified numerous techniques for tuning the degradation time, and optimizing the composites for various conditions of use.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should not be read as pertaining only to the precise structures described and shown in the accompanying drawings, but rather should be read as consistent with and as support for the following claims, which are to have their fullest and fairest scope.

The statements made herein merely provide information related to the present disclosure and may not constitute prior art. The following references are hereby incorporated by reference to the current application in their entireties for all purposes.

Zhang X. et al., 'Morphological behavior of poly(lactic acid) during hydrolytic degradation', Polymer Degradation and Stability 93 (2008) 1964-1970 and ref. therein.

Tarantili P. A., 'Swelling and hydrolytic degradation of poly(D, L-lactic acid) in aqueous solution', Polymer Degradation and Stability 91 (2006) 614-619 and ref. therein.

Xanthos Q., Nanoclay and crystallinity effects on the hydrolytic degradation of polylactides', Polymer Degradation and Stability 93 (2008) 1450-1459 and ref. therein.

Ratheesh et al., Materials Chemistry and Physics 122 (2010) 317-320 (coating on MgO).

Meyer B. et al., 'Partial dissociation of water leads to stable superstructures on the surface of ZnO', Angew. Chem. Int. Ed. 2004, 43, 6642-6645.

Chrisholm et al., 'Hydrolytic stability of sulfonated poly (butylenes terephthalate', Polymer, 44 (2003) 1903-1910.

Guido Grundmeier et al., 'Stabilization and acidic dissolution Mechanism of Single-Crystalline ZnO(0001) surfaces in electrolytes studied by In-Situ AFM Imaging and Ex-Situ LEED', Langmuir 2008, 24, 5350-5358.

Martin Muhler, et al., 'The identification of hydroxyl groups on ZnO nanoparticles by Infrared spectroscopy', Phys. Chem. Chem. Phys., 2008, 10, 7092-7097.

Arrigo Calzolari, et al., 'Water adsorption on Nonpolar ZnO(1010) surface: A microscopic understanding', J. Phys. Chem. C 2009, 113, 2896-2902.

PCT/US11/49169, 'Mechanisms for treating subterranean formations with embedded additives'.

US20060083917, US20100273685, U.S. Pat. No. 5,916,678, U.S. Pat. No. 7,858,561, U.S. Pat. No. 7,833,950, U.S. Pat. No. 7,786,051, U.S. Pat. No. 7,775,278, U.S. Pat. No. 7,748,452, U.S. Pat. No. 7,703,521, U.S. Pat. No. 7,565,929, U.S. Pat. No. 7,380,601, U.S. Pat. No. 7,380,600, U.S. Pat. No. 7,275,596.

What is claimed is:

1. A degradable composite composition comprising a degradable polymer mixed with discrete particles of a water soluble filler, a wax filler, or a reactive filler, said degradable composite degrading in 60° C. water in less than 30 days wherein the composition further comprises a metal salt of a long chain fatty acid.

2. The degradable composite composition of claim 1, wherein the discrete particles have a mean average size of from 10 nm to 5 micron.

3. The degradable composite composition of claim 1, wherein the discrete particles have a protective coating.

4. The degradable composite composition of claim 1, wherein the degradable polymer comprise aliphatic polyesters, poly(lactic acid) (PLA), poly(ε-caprolactone), poly (glycolic acid), poly(lactic-co-glycolic acid), poly(hydroxyl ester ether), polyhydroxyalkanoate (PHA), poly(hydroxybutyrate), poly(anhydride), polycarbonate, poly(amino acid), poly(ethylene oxide), poly(phosphazene), polyether ester, polyester amide, polyamides, sulfonated polyesters, poly (ethylene adipate), polyhydroxyalkanoate, poly(ethylene terephtalate), poly(butylene terephthalate), poly(trimethylene terephthalate), Poly(ethylene naphthalate) and copolymers, blends, derivatives or combination of any of these degradable polymers.

5. The degradable composite composition of claim 1, wherein the degradable polymer comprises PLA.

6. The degradable composite composition of claim 1 wherein,
a. said water soluble filler comprises salt (NaCl), $ZnCl_2$, $CaCl_2$, $MgCl_2$, $NaCO_3$, $KCO_3$, potassium phosphate ($KH_2PO_4$, $K_2HPO_4$, $K_3PO_4$), and sulfonate salts such as sodium benzenesulfonate (NaBS), sodium dodecylbenzenesulfonate (NaDBS), water soluble/hydrophilic polymers, poly(ethylene-co-vinyl alcohol) and poly (vinyl alcohols) (PVOH), and the mixture of these fillers;
b. said wax comprises candelilla wax, carnauba wax, ceresin wax, Japan wax, microcrystalline wax, montan wax, ouricury wax, ozocerite, paraffin wax, rice bran wax, sugarcane wax, Silicon wax, Fischer-Tropsch wax, and
c. said reactive filler comprises a metal oxide, metal hydroxide, metal carbonate, $Ca(OH)_2$, $Mg(OH)_2$, $CaCO_3$, Borax, MgO, CaO, ZnO, NiO, CuO, $Al_2O_3$, a base or a base precursor.

7. The degradable composite composition of claim 1, wherein the long chain fatty acid comprises Zn octonoate, Zn stearate, Sn octonoate, Ca stearate, Li stearate, Ca octonoate, Sr octonoate, Co octonoate, Ni octonoate, Li octonoate or K octonoate.

8. A degradable composite composition, comprising a metal salt of a long chain fatty acid and a PLA mixed with discrete particles of either i) a water soluble material, ii) a wax filler, iii) a reactive filler, or iv) combinations thereof, said degradable composite degrading in 60° C. water in less than 14 days.

9. The composition of claim 8, wherein the discrete particles being have a mean average size of from 10 nm to 5000 nm.

10. The composition of claim 8, wherein the discrete particles comprise:
   a. NaCl, $ZnCl_2$, $CaCl_2$, $MgCl_2$, $NaCO_3$, $KCO_3$, $KH_2PO_4$, $K_2HPO_4$, $K_3PO_4$, NaBS, NaDBS, PEVOH PVOH and combinations thereof,
   b. candelilla wax, carnauba wax, ceresin wax, Japan wax, microcrystalline wax, montan wax, ouricury wax, ozocerite, paraffin wax, rice bran wax, sugarcane wax, Silicon wax, Fischer-Tropsch wax, or
   c. $Ca(OH)_2$, $Mg(OH)_2$, $CaCO_3$, Borax, MgO, CaO, ZnO, NiO, CuO, $Al_2O_3$, a base or a base precursor.

11. A composition, comprising:
   a. a matrix comprising a plurality of voids, said matrix comprising polylactic acid (PLA), polycarprolacton, polyglycolic acid (PGA), polylactic-co-polyglcolic acid (PLGA), or a mixture thereof;
   b. a filler that fills in at least a portion of the plurality of the voids of said matrix;
   c. wherein the filler comprises NaCl, $ZnCl_2$, $CaCl_2$, $MgCl_2$, $NaCO_3$, $KCO_3$, $KH_2PO_4$, $K_2HPO_4$, $K_3PO_4$, NaBS, NaDBS, PEVOH, PVOH, candelilla wax, carnauba wax, ceresin wax, Japan wax, microcrystalline wax, montan wax, ouricury wax, ozocerite, paraffin wax, rice bran wax, sugarcane wax, Silicon wax, Fischer-Tropsch wax, $Ca(OH)_2$, $Mg(OH)_2$, $CaCO_3$, Borax, MgO, CaO, ZnO, NiO, CuO, or $Al_2O_3$; and
   d. wherein the composition degrades in water at a temperature of below 60° C. in less than 2 weeks;
   e. wherein the composition further comprises a metal salt of a long chain fatty acid.

12. The composition of claim 11, wherein said filler is coated with a protective coating.

13. A method of using a degradable composite composition, comprising injecting a fluid comprising water, a metal salt of a long chain fatty acid and a degradable composite comprising a degradable polymer mixed with discrete particles of a water soluble filler, a wax filler, or a reactive filler, said degradable composite degrading in 60° C. water in less than 30 days into a subterranean reservoir; degrading said composition, and producing a hydrocarbon from said subterranean reservoir.

14. The method of claim 13, wherein the discrete particles have a mean average size of from 10 nm to 5 micron.

15. The method of claim 13, wherein the discrete particles have a protective coating.

16. The method of claim 13, wherein the degradable polymer comprises PLA.

17. The method of claim 13, wherein the discrete particles have a mean average size of from 30 nm-300 nm.

18. The method of claim 13, wherein the degradable composite degrades in 60° C. water in less than 7 days.

* * * * *